United States Patent
Zhang et al.

(10) Patent No.: US 8,761,171 B1
(45) Date of Patent: *Jun. 24, 2014

(54) REDUCING UNNECESSARY UPSTREAM TRAFFIC IN PIM-BIDIRECTIONAL MODE

(75) Inventors: Zhaohui Zhang, Westford, MA (US); WeeSan Lee, Arcadia, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 138 days.

This patent is subject to a terminal disclaimer.

(21) Appl. No.: 13/247,360

(22) Filed: Sep. 28, 2011

Related U.S. Application Data

(60) Provisional application No. 61/482,492, filed on May 4, 2011.

(51) Int. Cl.
*H04L 12/28* (2006.01)

(52) U.S. Cl.
USPC .......................................................... 370/390

(58) Field of Classification Search
None
See application file for complete search history.

(56) References Cited

U.S. PATENT DOCUMENTS

| | | | | |
|---|---|---|---|---|
| 7,808,930 | B2* | 10/2010 | Boers et al. | 370/256 |
| 7,808,993 | B2 | 10/2010 | Zwiebel et al. | |
| 7,925,778 | B1* | 4/2011 | Wijnands et al. | 709/238 |
| 2007/0030817 | A1* | 2/2007 | Arunachalam et al. | 370/254 |
| 2007/0165632 | A1* | 7/2007 | Zwiebel | 370/390 |
| 2008/0298360 | A1* | 12/2008 | Wijnands et al. | 370/389 |
| 2011/0128957 | A1* | 6/2011 | Singh et al. | 370/390 |
| 2011/0211578 | A1* | 9/2011 | Zwiebel et al. | 370/390 |
| 2011/0286450 | A1* | 11/2011 | Wijnands | 370/390 |
| 2011/0305239 | A1* | 12/2011 | Chandrashekharachar Suvarneshwar | 370/390 |
| 2012/0076067 | A1 | 3/2012 | Yao et al. | |
| 2012/0163373 | A1 | 6/2012 | Lo et al. | |

FOREIGN PATENT DOCUMENTS

WO 2012112162 A1 8/2012

OTHER PUBLICATIONS

Handley et al. "Bidirectional Protocol Independent Multicast (BIDIR-PIM)", Network Working Group, RFC 5015, Oct. 2007, 44 pgs.
Office Action from U.S. Appl. No. 13/342,765, dated Jul. 23, 2013, 22 pp.
Response filed Oct. 23, 2013 in U.S. Appl. No. 13/342,765, 16 pgs.

\* cited by examiner

*Primary Examiner* — Hassan Kizou
*Assistant Examiner* — Amy Ling
(74) *Attorney, Agent, or Firm* — Shumaker & Sieffert, P.A.

(57) ABSTRACT

Techniques are described for reducing unnecessary upstream traffic toward a rendezvous point (RP) of a network using Protocol Independent Multicast Bidirectional Mode. The techniques include determining whether the RP needs to receive multicast traffic for a multicast group and, when the RP does not need to receive the multicast traffic, sending RP-prune control messages for the multicast group to downstream routers. Upon receiving an RP-prune control message, a downstream router may prune an outgoing interface for the multicast group to prevent the downstream router from forwarding multicast traffic for the multicast group toward the RP. The downstream router may terminate the RP-prune control message or propagate the RP-prune control message to a further downstream router. Routers that send RP-prune control messages also create or update a RP-prune state for the multicast group that includes interfaces for the downstream routers to which the RP-prune control messages were sent.

28 Claims, 9 Drawing Sheets

REDUCING UNNECESSARY UPSTREAM TRAFFIC IN PIM-BIDIRECTIONAL MODE

This application claims the benefit of U.S. Provisional Application No. 61/482,492 filed May 4, 2011, the entire contents of which are incorporated by reference herein.

TECHNICAL FIELD

The invention relates to computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to transport multicast traffic from sources to receivers or subscriber devices for particular multicast groups. PIM may operate in several different modes, including Dense Mode (DM), Sparse Mode (SM), Source-Specific Mode (SSM), and Bidirectional Mode (BIDIR).

PIM-BIDIR, for example, may utilize a shared tree rooted at a rendezvous point (RP) to carry multicast traffic over the computer network between sources and receivers. PIM-BIDIR uses group state, not source-specific state, to natively forward multicast traffic for a multicast group from a source toward the RP for distribution to all routers in the shared tree for the multicast group. PIM-BIDIR may preferably be used as the multicast routing protocol in computer networks with densely populated receivers. Further details of PIM-BIDIR are described in Request for Comment (RFC) 5015, "Bidirectional Protocol Independent Multicast (BIDIR-PIM)," Internet Engineering Task Force, October 2007, the entire contents of which are incorporated herein by reference.

SUMMARY

In general, techniques are described for reducing unnecessary upstream traffic toward a rendezvous point (RP) in a network using Protocol Independent Multicast (PIM) Bidirectional Mode (PIM-BIDIR). Conventionally, routers within the network use PIM-BIDIR procedures to forward all multicast traffic for a multicast group from a source toward the RP regardless of whether the RP needs to receive the multicast traffic for forwarding to other downstream routers. This may result in the RP having to discard large amounts of unnecessary multicast traffic. The techniques include determining whether the RP needs to receive multicast traffic for a multicast group and, when the RP does not need to receive the multicast traffic, sending RP-prune control messages for the multicast group to downstream routers. Upon receiving an RP-prune control message, a downstream router prunes the outgoing interface toward the RP for the multicast group to prevent the downstream router from forwarding multicast traffic for the multicast group toward the RP.

According to the techniques, when the RP sends an RP-prune control message to a downstream router, the downstream router terminates the RP-prune control message or propagates the RP-prune control message to a further downstream router. Any router that sends an RP-prune control message also creates or updates a RP-prune state for the multicast group that includes interfaces for the downstream routers to which the RP-prune control messages were sent. If the RP or another router later needs to receive the multicast traffic, the router looks up the RP-prune state and sends a RP-graft message for the multicast group to the downstream router. The downstream router receiving the RP-graft message adds back the outgoing interface toward the RP to enable the downstream router to again forward traffic toward the RP. In this way, the techniques reduce an amount of unnecessary upstream traffic to a RP in a network using PIM-BIDIR while adding only a minimal amount of state and protocol traffic on relevant routers in the network.

In one example, the disclosure is directed to a method comprising determining whether a RP router in a network needs to receive multicast traffic for a multicast group from a downstream router in the network, wherein the RP receives the multicast traffic using PIM-BIDIR, when the RP router does not need to receive the multicast traffic, sending a RP-prune control message for the multicast group toward the downstream router, and updating a RP-prune state for the multicast group in a control plane of the RP router to include an interface for the downstream router.

In another example, the disclosure is directed to a method comprising receiving a RP-prune control message for a multicast group with a downstream router in a network from a RP router in the network when the RP router does not need to receive multicast traffic for the multicast group from the downstream router, wherein the downstream router receives the RP-prune control message PIM-BIDIR, and pruning an outgoing interface toward the RP router for the multicast group from a control plane of the downstream router to prevent the downstream router from forwarding multicast traffic for the multicast group towards the RP router.

In a further example, the disclosure is directed to a RP router comprising a set of interfaces that transfer control messages and multicast traffic with one or more neighboring downstream routers in a network using PIM-BIDIR, and a control unit that includes a routing engine and a forwarding engine. The control unit determines whether the RP router needs to receive multicast traffic for a multicast group from a downstream router in the network, and, when the RP router does not need to receive the multicast traffic, the control unit directs one of the set of interfaces to send a RP-prune control message for the multicast group to the downstream router, and updates a RP-prune state for the multicast group in the routing engine to include an interface for the downstream router.

In another example, the disclosure is directed to a downstream router comprising a set of interfaces that transfer control messages and multicast traffic with a RP router and one or more neighboring downstream routers in a network using PIM-BIDIR, and wherein one of the set of interfaces receives a RP-prune control message for a multicast group from the RP router when the RP router does not need to receive multicast traffic for the multicast group from the downstream router. The downstream router also comprises a control unit that includes a routing engine and a forwarding engine, wherein the control unit prunes an outgoing interface toward the RP router for the multicast group from the routing engine to prevent the downstream router from forwarding multicast traffic for the multicast group to the RP router.

In a further example, the disclosure is directed to a computer-readable storage medium encoded with instructions for causing one or more programmable processors to determine whether a RP router in a network needs to receive multicast traffic for a multicast group from a downstream router in the network, wherein the RP receives the multicast traffic using PIM-BIDIR, when the RP router does not need to receive the multicast traffic, send a RP-prune control message for the multicast group toward the downstream router, and update a RP-prune state for the multicast group in a control plane of the RP router to include an interface for the downstream router.

In an additional example, the disclosure is directed to a computer-readable storage medium encoded with instructions for causing one or more programmable processor to receive a RP-prune control message for a multicast group with a downstream router in a network from a RP router in the network when the RP router does not need to receive multicast traffic for the multicast group from the downstream router, wherein the downstream router receives the RP-prune control message using PIM-BIDIR, and prune an outgoing interface toward the RP router for the multicast group from a control plane of the downstream router to prevent the downstream router from forwarding multicast traffic for the multicast group to the RP router.

The details of one or more examples of the invention are set forth in the accompanying drawings and the description below. Other features, objects, and advantages of the invention will be apparent from the description and drawings, and from the claims.

DETAILED DESCRIPTION

Figure 1:
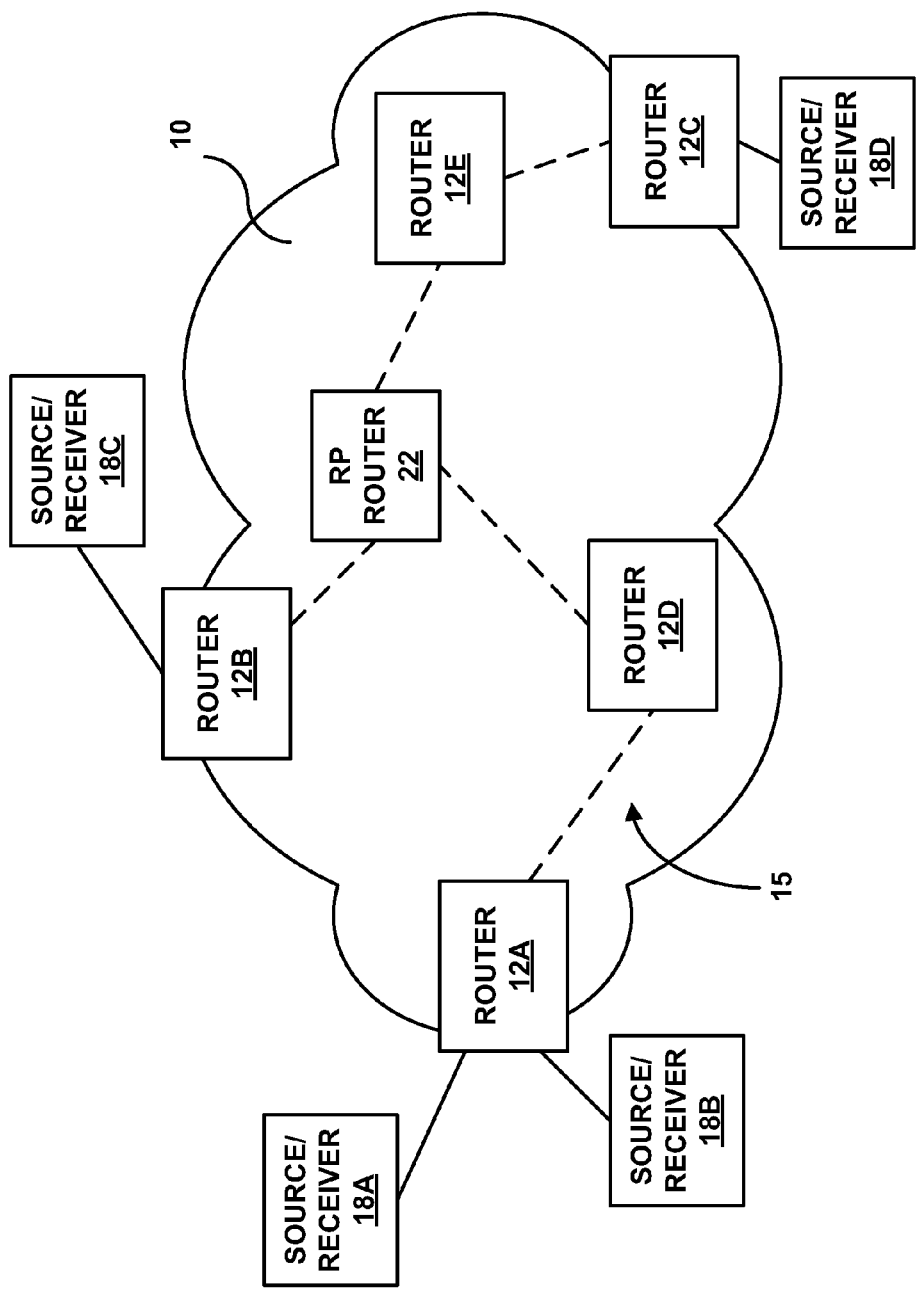
FIG. 1 is a block diagram illustrating an example computer network in which routers and a rendezvous point (RP) router provide multicast traffic between sources and receivers.

FIG. 1 is a block diagram illustrating an example computer network 10 in which routers 12A-12E ("routers 12") and a rendezvous point (RP) router 22 provide multicast traffic between sources and receivers 18A-18D ("sources/receivers 18"). In the illustrated example, routers 12 are included within a shared tree 15 rooted at RP router 22 to carry multicast traffic across computer network 10 using Protocol Independent Multicast (PIM) Bidirectional Mode (PIM-BIDIR). The techniques of this disclosure, described in more detail below, include reducing unnecessary upstream traffic toward RP router 22 in network 10.

Computer network 10, for example, may be an enterprise network, a campus network, a service provider network, a home network, or another autonomous system. In any of these examples, remotely located sources/receivers 18 may share data via computer network 10. As one example of network 10 as an enterprise network, each of sources/receivers 18 may comprise one or more servers or employee computer terminals located in different regions of a single office location. As another example of network 10 as an enterprise network, each of sources/receivers 18 may comprise a remote office location of a corporation such that enterprise network 10 may be extended across a public network, such as the Internet. Although illustrated in FIG. 1 as an enterprise network or a service provider network, the techniques of this disclosure are applicable to other network types, both public and private. Examples of other network types include local area networks (LANs), virtual local area networks (VLANs), virtual private networks (VPNs), and the like. In some examples, computer network 10 may be coupled to one or more additional private or public networks, e.g., the Internet. In other examples, computer network 10 may comprise the Internet or another public network. In some cases, computer network 10 may comprise a multi-protocol label switching (MPLS) network.

In the illustrated example, computer network 10 includes routers 12 and RP router 22, which may comprise edge routers and/or core routers. Each of routers 12 couples to one or more of sources/receivers 18. Each of sources/receivers 18 may be included in a remote site include a local area network (LAN) or a wide area network (WAN) that comprises a plurality of subscriber devices, such as desktop computers, laptops, workstations, PDAs, wireless devices, network-ready appliances, file servers, print servers or other devices. In some cases, the remote sites may be configured to support multicast traffic, such as Internet Protocol Television (IPTV), desktop conferences, corporate broadcasts, music and video web casts, and other forms of multimedia content.

An RP in a PIM-BIDIR network is an address, i.e., a rendezvous point address (RPA), toward which multicast traffic from sources and receivers rendezvous. The RPA is used as the root of the distribution tree for a range of multicast groups. The RPA must be routable from all routers in the PIM-BIDIR domain. The RPA does not need to correspond to an address for an interface of a real router. In this respect, PIM-BIDIR differs from PIM-SM, which requires an actual router to be configured as the RP. Join messages from receivers for a multicast group propagate hop-by-hop towards the RPA in the PIM-BIDIR network. A rendezvous point link (RPL) for a particular RPA is the physical link to which the RPA belongs. In BIDIR-PIM, all multicast traffic for multicast groups mapping to a specific RPA is forwarded on the RPL of that RPA. The RP, therefore, may comprise a real RP router configured with the RPA, or a general router connected to the RPL of the RPA, if the RPA is not configured on any particular router. In the example of FIG. 1, RP router 22 may comprise a real RP router configured with the RPA or a general router connected to the RPL of the RPA.

In the illustrated example, routers 12 use PIM-BIDIR to carry multicast traffic through computer network 10 via shared tree 15 from multicast sources/receivers 18. Shared tree 15 may include one or more bidirectional tunnels or paths that transport multicast traffic upstream, i.e., from sources 18 via routers 12 toward RP router 22, as well as downstream, i.e. away from RP router 22 toward receivers 18 via routers 12.

In accordance with PIM-BIDIR, computer network 10 may include one or more RPs, each being responsible for a particular range of multicast groups. For each RP, a conceptual tree may be formed across computer network 10 to connect routers 12 that maintain state for multicast groups within the particular range. For example, in order to form shared tree 15, one of routers 12 may select an upstream interface, i.e., a reverse path forwarding (RPF) interface, used to reach RP router 22 according to routing information stored on the router, and add it to shared tree 15. The one of routers 12 may add any other interface to shared tree 15 as a downstream interface if the router is the designated forwarder (DF) on the interface. The DF of a given interface is elected by all other routers connected by that interface.

Receivers 18 may subscribe to one or more multicast groups to receive multicast traffic. As described above, RP router 22 learns and stores source addresses for a certain range of multicast groups to which receivers 18 belong. Other RPs of other shared tress in computer network 10, not shown in FIG. 1, may be associated with different ranges of multicast groups. In this way, each of routers 12 does not need to learn and store the source addresses for every multicast group for which it has state, but only needs to learn the addresses of RP router 22 and other RPs associated with different ranges of multicast groups. In the illustrated example, RP router 22 knows the address of sources 18, but routers 12 only know the address of RP router 22.

As an example, when router 12A detects that a receiver 18 connected by an interface needs to receive traffic for a particular multicast group and router 12A is the DF for that interface, router 12A sends a (*, G) join control message on its RPF interface towards RP router 22. More specifically, router 12A determines an address of RP router 22, which is responsible for the multicast group range that includes the particular multicast group, and identifies its RPF interface as the interface closest to RP router 22 based on routing information stored on router 12A. Router 12A sends a (*, G) join control message because router 12A does not know the source of the multicast group. When an upstream router, e.g., router 12B, receives the (*, G) join control message and router 12B is the DF on the receiving interface, router 12B forwards the join control message further upstream towards RP router 22. According to this process, routers 12 may conceptually build shared tree 15 across computer network 10. Upon receipt, RP router 22 processes the (*, G) join control message and begins sending multicast traffic for the multicast group to router 12A. Router 12A then receives the requested multicast traffic on its RPF interface.

PIM-BIDIR uses group state to natively forward (*, G) multicast traffic for a multicast group from sources 18 toward RP router 22 for distribution to all routers in shared tree 15 that belong to the multicast group. For example, router 12A may use PIM-BIDIR to forward multicast traffic upstream from a source 18A toward RP router 22 via router 12D. RP router 22, in turn, uses PIM-BIDIR to forward the multicast traffic downstream to routers 12 that have state for the multicast group and toward receivers 18 of the multicast traffic.

Conventionally, a downstream router may send multicast traffic for a multicast group upstream from a source to the RP regardless of whether the RP needs to receive the multicast traffic for forwarding to neighboring routers. For example, an RP may not need to receive the multicast traffic when no receivers subscribe to the multicast group, or when the RP has only one neighboring downstream router that belongs to the multicast group. When the RP receives unnecessary multicast traffic, the RP drops the packets. This may result in the RP having to discard large amounts of unnecessary multicast traffic.

The techniques described in this disclosure are directed toward reducing the unnecessary upstream traffic forwarded toward a RP in a network using PIM-BIDIR. As an example, router 12A may send (*, G) multicast traffic upstream from a source toward RP router 22 via router 12D. According to the techniques, RP router 22 determines whether it needs to receive multicast traffic for a multicast group G from a downstream router. For example, RP router 22 may determine whether it has a (*, G) group state, i.e., whether any receivers subscribe to the multicast group. If RP router 22 does not have a (*, G) group state, then RP router 22 does not need to receive the multicast traffic from the downstream router. As another example, RP router 22 may determine whether it has more than one neighboring downstream router in a (*, G) group state for the multicast group G maintained by RP router 22. If RP router 22 does not have more than one neighboring downstream router in the (*, G) group state, then RP router 22 does not need to receive the multicast traffic from the neighboring downstream router.

When RP router 22 does not need to receive the multicast traffic, RP router 22 sends a RP-prune control message for the multicast group toward the downstream router. Upon receiving the RP-prune control message, the downstream router may prune an outgoing interface toward RP router 22 for the multicast group to prevent the downstream router from forwarding multicast traffic for the multicast group toward RP router 22. Additionally, the downstream router may terminate the RP-prune control message or propagate the RP-prune control message to a router located further downstream. In this way, the techniques may reduce unnecessary upstream traffic carried toward RP router 22 only to be dropped. This reduction in unnecessary upstream traffic may improve bandwidth for network 10.

The techniques of this disclosure also describe maintaining RP-prune states on relevant routers. For example, any router that sends an RP-prune control message, e.g., RP router 22 or a downstream router, also maintains a RP-prune state for the multicast group that includes the downstream router to which the RP-prune control message was sent. If the router later receives a join control message for the multicast group from the downstream router, the router may look to the RP-prune state to determine where to send a RP-graft message for the multicast group to enable the downstream router to again forward traffic toward RP router 22.

As described above, RP router 22 may comprise a real RP router configured with a RPA or a general router connected to a RP link of the RPA. When RP router 22 comprises a real RP router, the real RP router may be configured to perform the RP-prune/graft procedure according to the techniques described in this disclosure. For example, RP router 22 may be configured to only send RP-prune/graft control messages. On the other hand, when RP router 22 comprises a general router connected to the RP link, the general router may be configured to operate as both a general router and as an RP router to perform the RP-prune/graft procedure according to the techniques described in this disclosure. For example, RP router 22 may be configured to both send RP-prune/graft control messages as a RP router, and to receive RP-prune/graft control messages as a downstream router.

The techniques described in this disclosure reduce an amount of unnecessary upstream traffic toward RP router 22 in network 10 using PIM-BIDIR while adding only a minimal amount of state and protocol traffic only on relevant routers.

Figure 2:
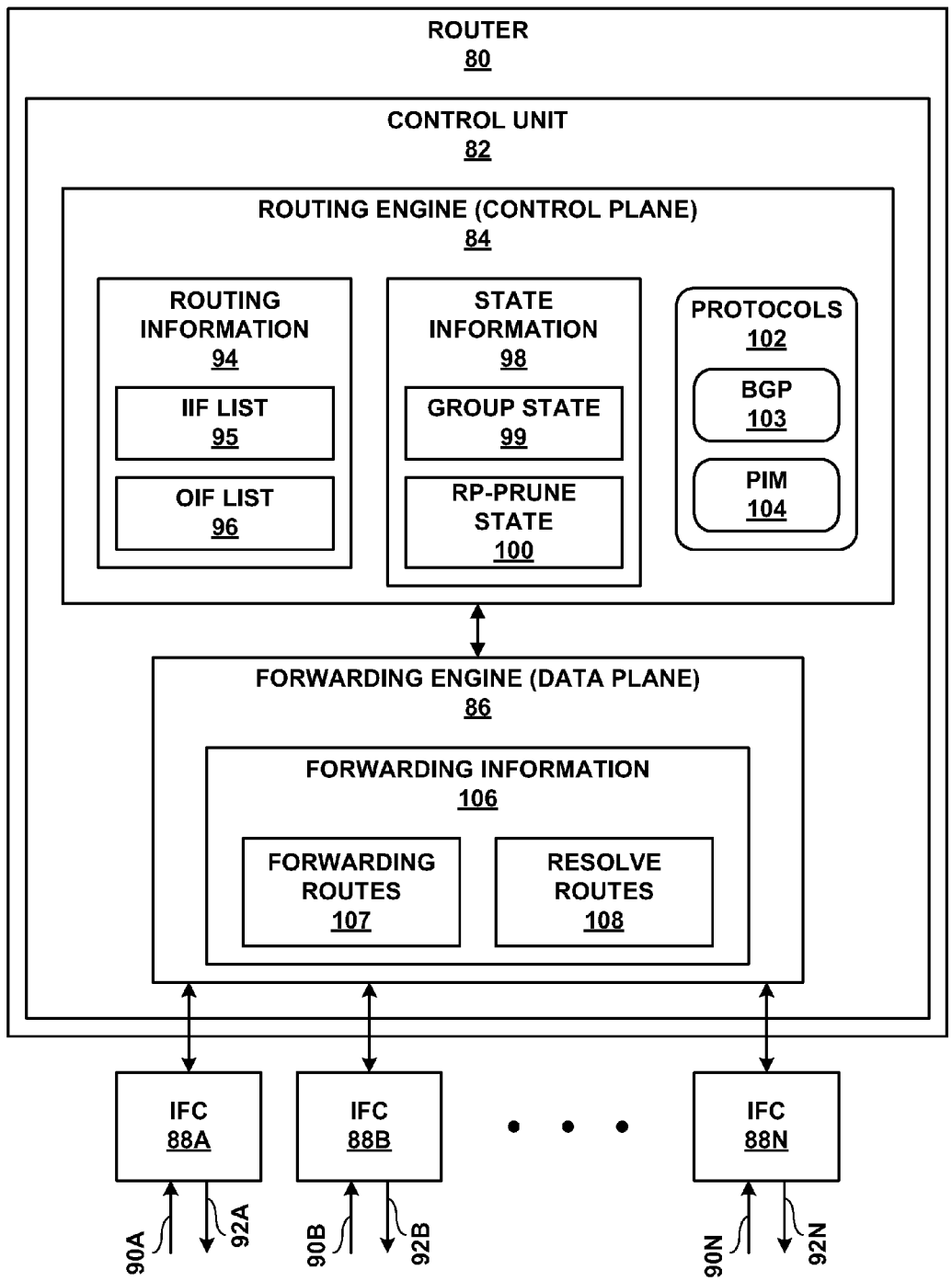
FIG. 2 is a block diagram illustrating an exemplary router capable of performing the disclosed techniques for reducing unnecessary upstream traffic toward a RP in a PIM-BIDIR network.

FIG. 2 is a block diagram illustrating an exemplary router 80 capable of performing the disclosed techniques for reducing unnecessary upstream traffic toward a RP of a PIM-BIDIR network. In one example, router 80 is a RP router of the PIM-BIDIR network. In this case, as described above, router 80 wherein the RP router comprises one of a real RP router configured with a RPA, or a general router connected to a RP link of the RPA. In another example, router 80 may be a downstream router in the PIM-BIDIR network. In general, router 80 may operate substantially similar to any of the routers illustrated in FIGS. 1 and 7-9.

In this example, router 80 includes interface cards 88A-88N ("IFCs 88") that receive multicast packets via incoming links 90A-90N ("incoming links 90") and send multicast packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a packet forwarding engine 86. Routing engine 84 operates as the control plane for router 80 and includes an operating system that provides a multi-tasking operating environment for execution of a number of concurrent processes. Routing engine 84 may implement one or more routing protocol 102 to execute routing processes. For example, routing protocols 102 may include Border Gateway Protocol (BGP) 103, for exchanging routing information with other routing devices and for updating routing information 94. In addition, routing protocols 102 may include PIM 104, and specifically PIM-BIDIR, for routing traffic through a computer network with other routing devices conceptually formed into shared tress. Routing engine 84 may also implement PIM 104 for exchanging link state information with other routing devices and updating state information 98, and routing multicast traffic through the shared trees according to routing information 94 and state information 98.

Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. In the illustrated example, routing information 94 includes an incoming interface (IIF) list 95 and an outgoing interface (OIF) list 96 that indicates which of IFCs 88 are connected to neighboring routing devices in each route. For example, a given route may comprise a route for multicast traffic for a given multicast group G. In that example, IIF list 95 may include a list of interfaces to all downstream routers in the shared tree, and OIF list 96 may include a list of interfaces to upstream and downstream routers that have state for the multicast group.

State information 98 may describe a current status of links between routing devices in the shared trees for the network. In the illustrated example, state information 98 includes group state 99 that describes which routing devices belong to which multicast groups within the range for the shared tree. In FIG. 2, state information 98 also includes RP-prune state 100 that indicates which outgoing interfaces for a given multicast group have been pruned from the shared tree in accordance with the techniques described in this disclosure.

Routing engine 84 analyzes stored routing information 94 and state information 98 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures. In the illustrated example of FIG. 2, forwarding information 106 includes forwarding routes 107 that include specific routes to forward multicast traffic for a given multicast group to neighboring routing devices. In general, when router 80 receives a multicast packet via one of inbound links 90, control unit 82 determines a next hop for the packet in accordance with routing information 94 and state information 98, and forwards the packet according to the next hop.

Forwarding information 106 also includes resolve routes 108 that include routes for the data plane, i.e., forwarding engine 86, to send a notification to the control plane, i.e., routing engine 84, of router 88 regarding the traffic associated with the route. The term "resolve route" as used in this is disclosure is merely an exemplary term used to represent a function by which the data plane of a route can notifying the control plane when a particular type of data is received by the data plane. In general, the term "resolve route," "punting," or some other terminology, may be used to describe the act of notifying the control plane of received data matching certain criteria.

The techniques described in this disclosure are directed toward reducing the unnecessary upstream traffic toward a RP of a network using PIM-BIDIR. First, an exemplary operation of router 80 as a RP router of a PIM-BIDIR network will be descried. Second, an exemplary operation of router 80 as a downstream router of a PIM-BIDIR network will be described.

Figure 7:
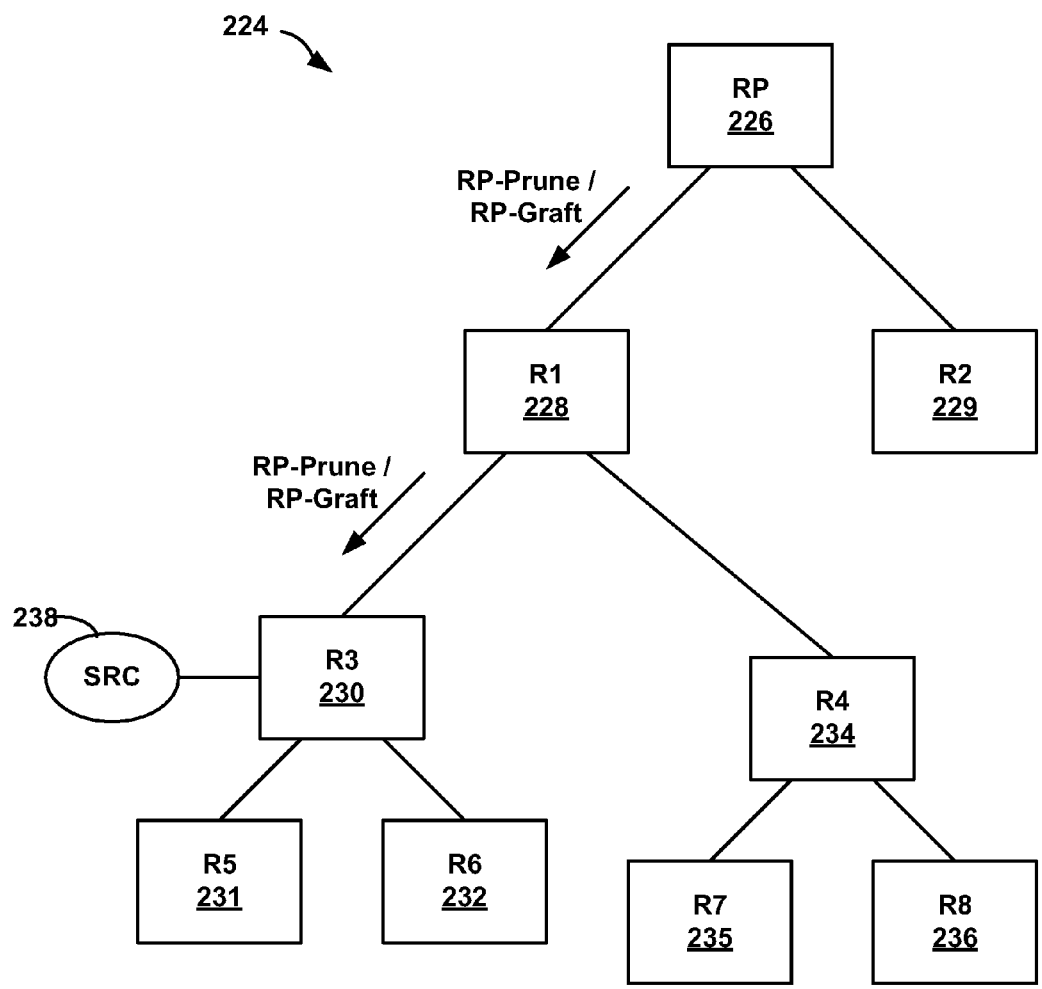
FIG. 7 is a block diagram illustrating an exemplary PIM-BIDIR network in which no receivers subscribe to a multicast group G.
Figure 8:
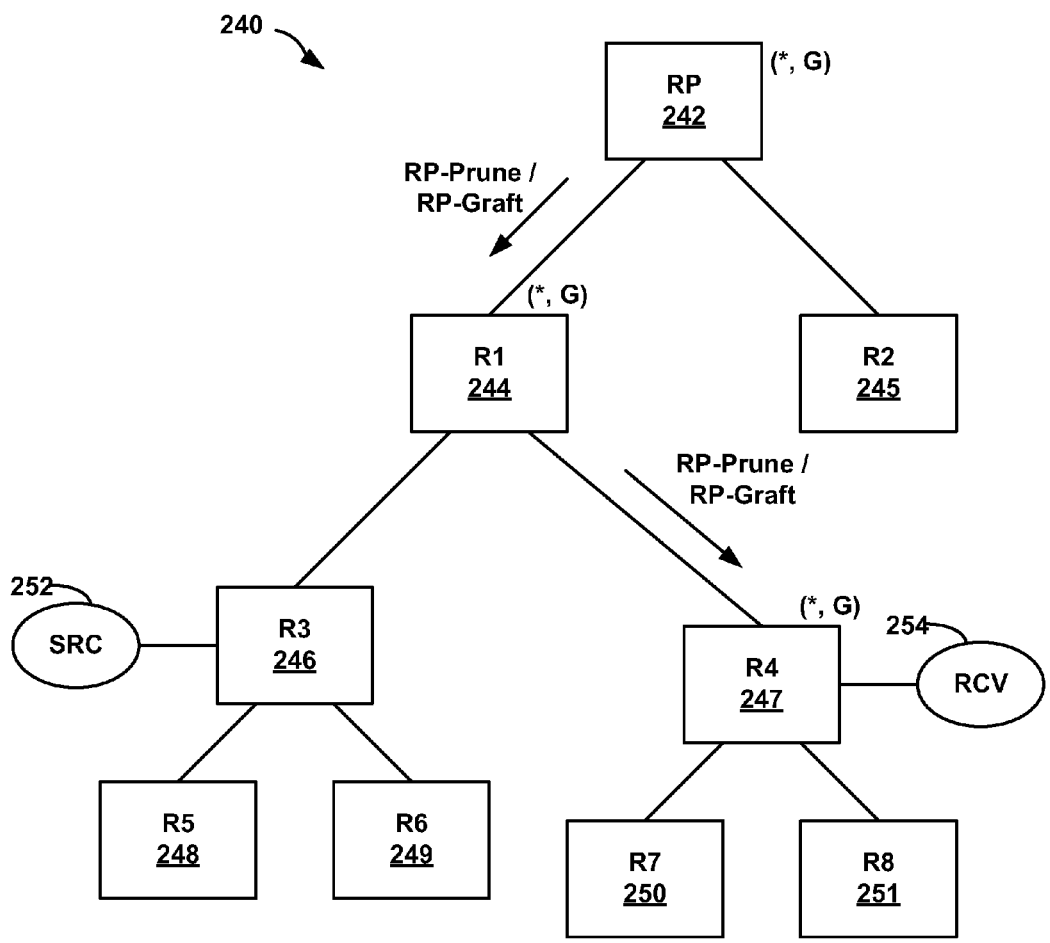
FIG. 8 is a block diagram illustrating an exemplary PIM-BIDIR network in which a RP router has only one neighboring downstream router that belongs to a multicast group G.
Figure 9:
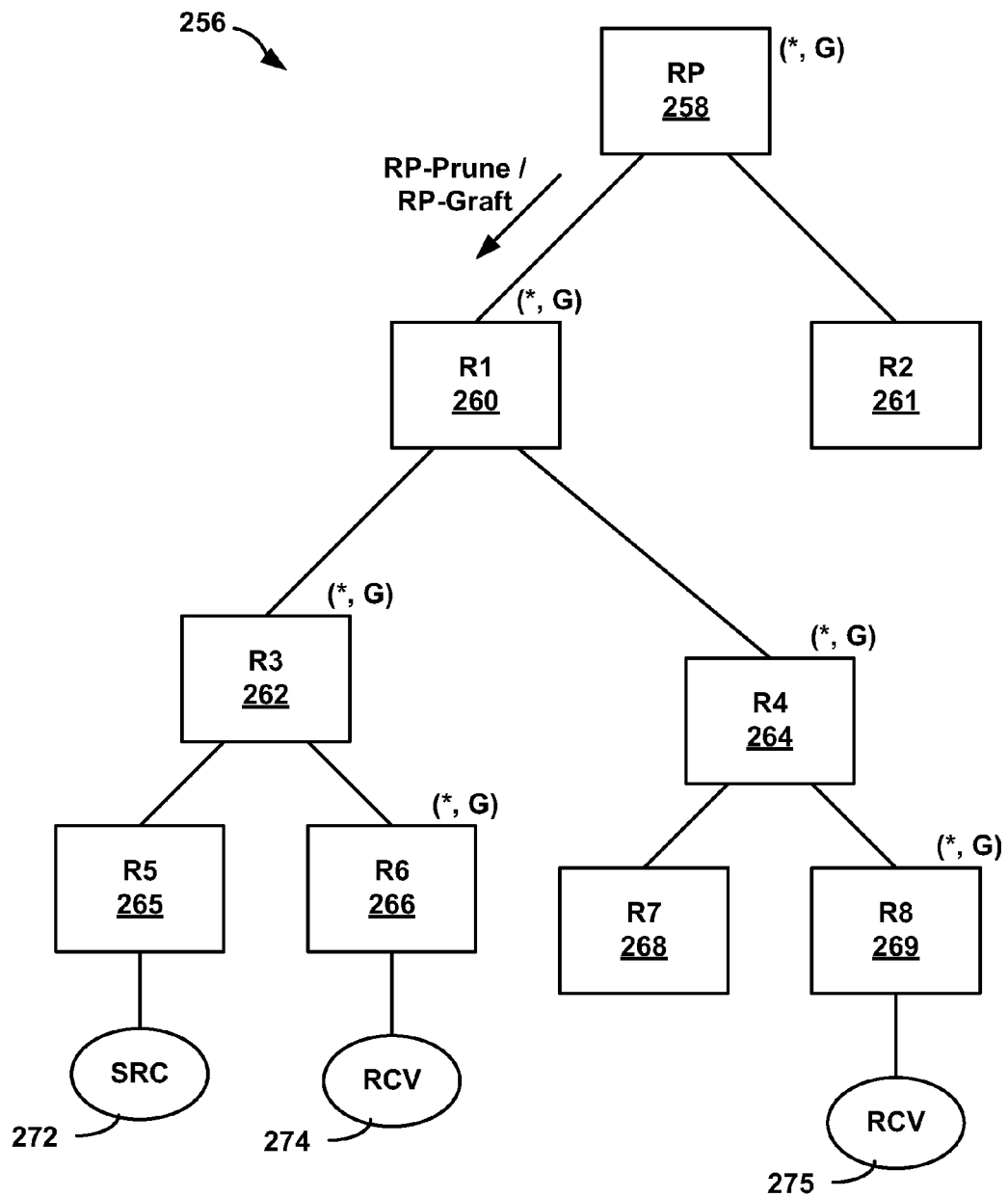
FIG. 9 is a block diagram illustrating an exemplary PIM-BIDIR network in which a RP router has only one neighboring downstream router, and the downstream router has more than one neighboring downstream router that belongs to a multicast group G.

As a first example, router 80 may comprise the RP router of a PIM-BIDIR network, such as RP router 226 of network 224 from FIG. 7, RP router 242 of network 240 from FIG. 8, or RP router 258 of network 256 from FIG. 9. RP router 80 may be associated with a certain range of multicast groups (*, G_prefix). For each specific multicast group within the range, RP router 80 may maintain an IIF list 95 and an OIF list 96 within routing information 94, and a group state 99 and a RP-prune state 100 within state information 98.

In addition, for each specific multicast group within the range, RP router 80 may include forwarding routes 107 to the downstream routers in the shared tree that belong to the multicast group. According to the disclosed techniques, RP router 80 also includes a (*, G_prefix) resolve route within resolve routes 108. Multicast traffic matching the (*, G_prefix) resolve route triggers a notification to routing engine 84 of RP router 80 that RP router 80 is receiving the multicast traffic unnecessarily. The (*, G_prefix) resolve route may notify the control plane of RP router 80 when multicast traffic is received for a multicast group within the range for which RP router 80 currently does not maintain a group state 99.

When RP router 80 receives (*, G) multicast traffic from a downstream router, control unit 82 looks to state information 98 to determine whether it maintains group state 99 for the multicast group G. When RP router 80 does not maintain a group state 99 for the multicast group, then no receivers in the network subscribe to the multicast group and RP router 80 may drop the traffic. To avoid sending multicast traffic upstream to RP router 80 just to be dropped, RP router 80 may use the (*, G_prefix) resolve route within resolve routes 108 to prune an interface on which the multicast traffic was received. As described above, the term "resolve route" is merely an exemplary term used to describe the act of notifying the control plane of received data matching certain criteria, in this case unnecessarily received multicast traffic. In other cases, the term "punting," or some other terminology, may be used to represent the same function.

As an example, when RP router 80 does not maintain a specific group state 99 for multicast group, the (*, G) multicast traffic hits the (*, G_prefix) resolve route, and triggers a notification to routing engine 84 of RP router 80. The notification tells routing engine 84 that RP router 80 does not need to receive the (*, G) multicast traffic. Control unit 82 then selects the downstream interface from IIF list 95 on which the (*, G) multicast traffic was received to send a RP-prune control message for the multicast group to the downstream router. Control unit 82 also creates and/or updates a RP-prune state 100 for the multicast group G to include the downstream interface to the downstream router on which the RP-prune control message was sent.

Conversely, when RP router 80 maintains a group state 99 for the multicast group, then one or more receivers associated with the network subscribe to the multicast group. In that case, RP router 80 may forward the (*, G) multicast traffic to one or more neighboring downstream routers according to forwarding routes 107 for the multicast group. In some cases, however, RP router 80 may still drop the (*, G) multicast traffic when the only route included in forwarding routes 107 for the multicast group is back to the downstream router from which the multicast traffic was received.

To again avoid sending multicast traffic upstream to RP router 80 just to be dropped, RP router 80 may prune an interface to a downstream router when it is the only neighboring downstream router of RP router 80 that belongs to the multicast group. As an example, when control unit 82 updates the group state 99 for the multicast group in response to control messages, such as join control messages and/or prune control messages, for the multicast group G, control unit 82 may also determine whether RP router 80 has more than one neighboring downstream router that belongs to the multicast group.

When RP router 80 only has one neighboring downstream router that belongs to the multicast group G, control unit 82 selects the downstream interface from IIF list 95 of the neighboring downstream router to send a RP-prune control message for the multicast group G to the neighboring downstream router. Control unit 82 also creates and/or updates a RP-prune state 100 for the multicast group G to include the downstream interface to the neighboring downstream router on which the RP-prune control message was sent.

In either case, control unit 82 maintains RP-prune state 100 for each multicast group in order to keep track of where the RP-prune control messages have been sent. If RP router 80 later receives a join control message for the multicast group G, control unit 82 updates the group state 99 for the multicast group and determines that a RP-prune control message was previously sent to a downstream router based on RP-prune state 100 for the multicast group. Control unit 82 may then send a RP-graft control message to the downstream router on the downstream interface indicated in RP-prune state 100. Upon sending the RP-graft control message to the downstream router, control unit 82 may remove the downstream interface from RP-prune state 100 for the multicast group G. In this way, RP router 80 may again receive multicast traffic from the downstream router to further propagate to the multicast traffic based on the updated group state 99 for the multicast group.

As a second example, router 80 may comprise the downstream router of a PIM-BIDIR network, such as R1 228 of network 224 from FIG. 7, R1 244 of network 240 from FIG. 8, or R1 260 of network 256 from FIG. 9. Downstream router 80 may be included in a network with a RP that is associated with a certain range of multicast groups (*, G_prefix). For each specific multicast group within the range, downstream router 80 may maintain an IIF list 95 and an OIF list 96 within routing information 94, and a group state 99 and a RP-prune state 100 within state information 98.

In addition, for each specific multicast group within the range, downstream router 80 may include forwarding routes 107 to upstream and/or downstream routers in the shared tree that belong to the multicast group. Downstream router 80 also includes a (*, G_prefix) forwarding route in forwarding routes 107 that has an outgoing interface set to the RPF interface of downstream router 80 toward the RP of the network. According to the disclosed techniques, for each specific multicast group within the range, downstream router 80 may also include a (*, G) resolve route within resolve routes 108. When installed in downstream router 80, the (*, G) resolve route may notify the control plane of downstream router 80 when multicast traffic is received for a multicast group for which downstream router 80 does not have (*, G) state.

When downstream router 80 receives a RP-prune control message for a multicast group G from the RP, control unit 82 looks to state information 98 to determine whether it has group state 99 for the multicast group G. When downstream router 80 does not have a group state 99 for the multicast group, control unit 82 installs a resolve route for the multicast group in resolve routes 108. The resolve route effectively prunes the RPF interface of downstream router 80 toward the RP as the outgoing interface for (*, G) multicast traffic by instead providing an outgoing interface set to routing engine 84 of downstream router 80. Control unit 82 also creates an RP-prune state 100 for the multicast group G, but, as this point, includes no downstream interface in RP-prune state 100. Control unit 82 then terminates the RP-prune control message for the multicast group until downstream router 80 receives subsequent (*, G) multicast traffic from a further downstream router.

When downstream router 80 receives subsequent (*, G) multicast traffic, the multicast traffic hits the resolve route for the multicast group installed in resolve routes 108 and triggers a notification to routing engine 84 of downstream router 80. The notification tells routing engine 84 that downstream router 80 does not need to forward the (*, G) multicast traffic to the RP. Control unit 82 then selects the downstream interface from IIF list 95 on which the (*, G) multicast traffic was received to propagate the RP-prune control message for the multicast group to the further downstream router. Control unit 82 also updates the RP-prune state 100 for the multicast group G to include the downstream interface to the further downstream router on which the RP-prune control message was sent.

Conversely, when downstream router 80 has a group state 99 for the multicast group G, control unit 82 removes the RPF interface of downstream router 80 from OIF list 96 for the multicast group. Control unit 82 also creates an RP-prune state 100 for the multicast group G, but, as this point, includes no downstream interface in RP-prune state 100. Control unit 82 then determines whether downstream router 80 has more than one neighboring downstream router that belongs to the multicast group G. When downstream router 80 only has one neighboring downstream router that belongs to the multicast group, control unit 82 selects the downstream interface from IIF list 95 of the neighboring downstream router to propagate a RP-prune control message for the multicast group G to the neighboring downstream router. Control unit 82 also updates the RP-prune state 100 for the multicast group G to include the downstream interface to the neighboring downstream router on which the RP-prune control message was sent.

If downstream router 80 later receives a RP-graft control message for the multicast group G from the RP router, control unit 82 again looks to state information 98 to determine whether it has group state 99 for the multicast group G. When RP router 80 does not have a group state 99 for the multicast group, control unit 82 removes the resolve route for the multicast group G installed in resolve routes 108. Conversely, when downstream router 80 has a group state 99 for the multicast group G, control unit 82 adds the RPF interface of downstream router 80 toward the RP router back to OIF list 96 for the multicast group.

The techniques described in this disclosure reduce an amount of unnecessary upstream traffic toward a RP of a network using PIM-BIDIR only to be dropped. The reduction in unnecessary upstream traffic may improve bandwidth in the computer network. Moreover, the techniques may only add a minimal amount of state on the RP router and relevant routers in the network.

The architecture of router 80 illustrated in FIG. 2 is shown for exemplary purposes only. The invention is not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 3:
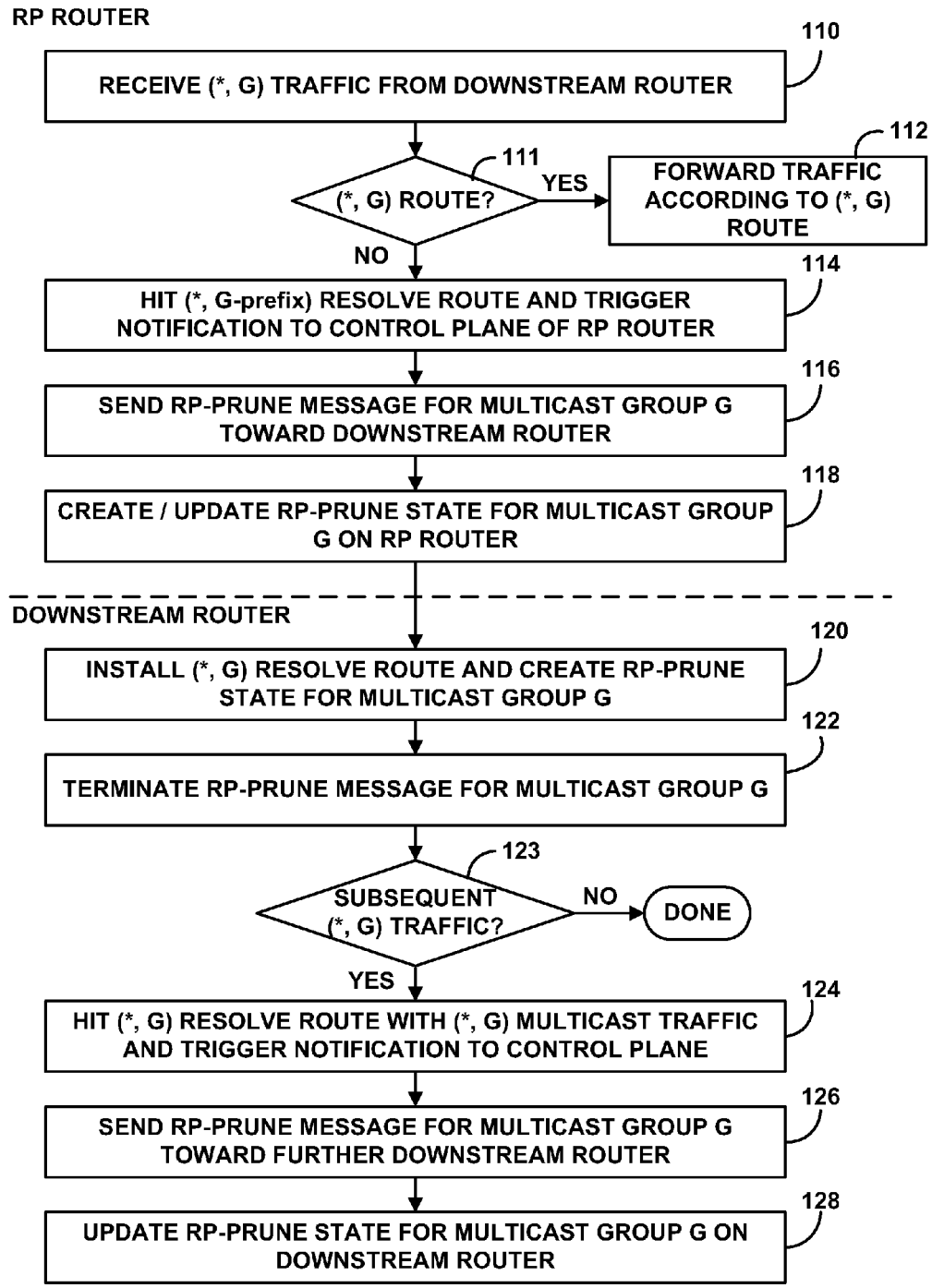
FIG. 3 is a flow chart illustrating an exemplary pruning operation of a RP router and a downstream router in a PIM-BIDIR network in which no receivers subscribe to a multicast group G.

FIG. 3 is a flow chart illustrating an exemplary pruning operation of a RP router and a downstream router in a PIM-BIDIR network in which no receivers subscribe to a multicast group G. The operation illustrated in FIG. 3 will be described in reference to RP router 226 and downstream router R1 228 of PIM-BIDIR network 224 from FIG. 7.

RP router 226 may be associated with a certain range of multicast groups G_prefix. In the illustrated example of FIG. 7, no receivers subscribe to the multicast group G such that no routers have (*, G) group states. The downstream routers include (*, G_prefix) forwarding routes with outgoing interfaces set to the reverse path forwarding (RPF) interface toward RP router 226. In addition, according to the disclosed techniques, RP router 226 includes a (*, G_prefix) resolve route that triggers resolve notifications to its control plane, instead of a conventional (*, G_prefix) forwarding route with no outgoing interfaces.

According to the (*, G_prefix) forwarding routes, R3 230 and R1 228 forward multicast traffic for the multicast group G from source 238 upstream to RP router 226. RP router 226 receives G multicast traffic from downstream router R1 228 (110). RP router 226 determines whether the multicast traffic matches a (*, G) forwarding route (111). If the multicast traffic matches a (*, G) forwarding route (YES of 111), then RP router 226 forwards the (*, G) multicast traffic to a neighboring downstream router according to the (*, G) forwarding route (112).

If the multicast traffic does not match a (*, G) forwarding route and instead matches the (*, G_prefix) resolve route, as in the illustrated example of FIG. 2 (NO of 111), the (*, G) multicast traffic hits the (*, G_prefix) resolve route installed in RP router 226 it triggers a notification to the control plane of RP router 226 (114) indicating that RP router 226 is receiving the multicast traffic unnecessarily. In response to the control plane notification, RP router 226 sends a RP-prune control message for the multicast group G to downstream router R1 228 on the downstream interface on which it received the (*, G) multicast traffic (116). In addition, RP router 226 creates and/or updates a RP-prune state for the specific multicast group G to include the downstream interface to R1 228 on which the RP-prune control message was sent (118).

When downstream router R1 228 receives the RP-prune control message for the multicast group G, R1 228 installs a (*, G) resolve route and creates a RP-prune state for the multicast group G (120). By installing the (*, G) resolve route, R1 228 will no longer forward any (*, G) multicast traffic toward RP router 226, because the multicast traffic will no longer match the (*, G_prefix) forwarding route and instead will match the (*, G) resolve route. R1 228 then terminates the RP-prune control message (122). At this point, the (*, G) RP-prune state on R1 228 has no downstream interface. The RP-prune control state remains terminated at R1 228 unless R1 228 receives subsequent (*, G) multicast traffic from R3 230 (NO of 123).

If, however, R1 228 later receives subsequent (*, G) multicast traffic from R3 230 (YES of 123), the multicast traffic will hit the (*, G) resolve route installed on R1 228, causing the multicast traffic to be dropped, and trigger a notification to be sent to the control plane of R1 228 indicating that R1 228 is receiving the multicast traffic unnecessarily (124). As a result, R1 228 sends the RP-prune control message for the multicast group G to downstream router R3 230 on the downstream interface on which it received the (*, G) multicast traffic (126). In addition, R1 228 updates its RP-prune state for the multicast group G to include the downstream interface toward downstream router R3 230 on which the RP-prune control message was sent (128). The further downstream router R3 230 may then perform at least some of the same operations to install a (*, G) resolve route. In this case, because R3 230 is connected to source 38, no further downstream routers exist to process the RP-prune control message.

By installing the (*, G) resolve routes, R3 230 and R1 228 will no longer forward any (*, G) multicast traffic toward RP router 226. Instead, when R3 230 receives (*, G) multicast traffic from source 238, the multicast traffic will hit the (*, G) resolve route and be dropped by R3 230. In this way, unnecessary upstream traffic will not be carried toward RP router 226 only to be dropped. This reduction in unnecessary upstream traffic improves bandwidth utilization in the network.

Figure 4:
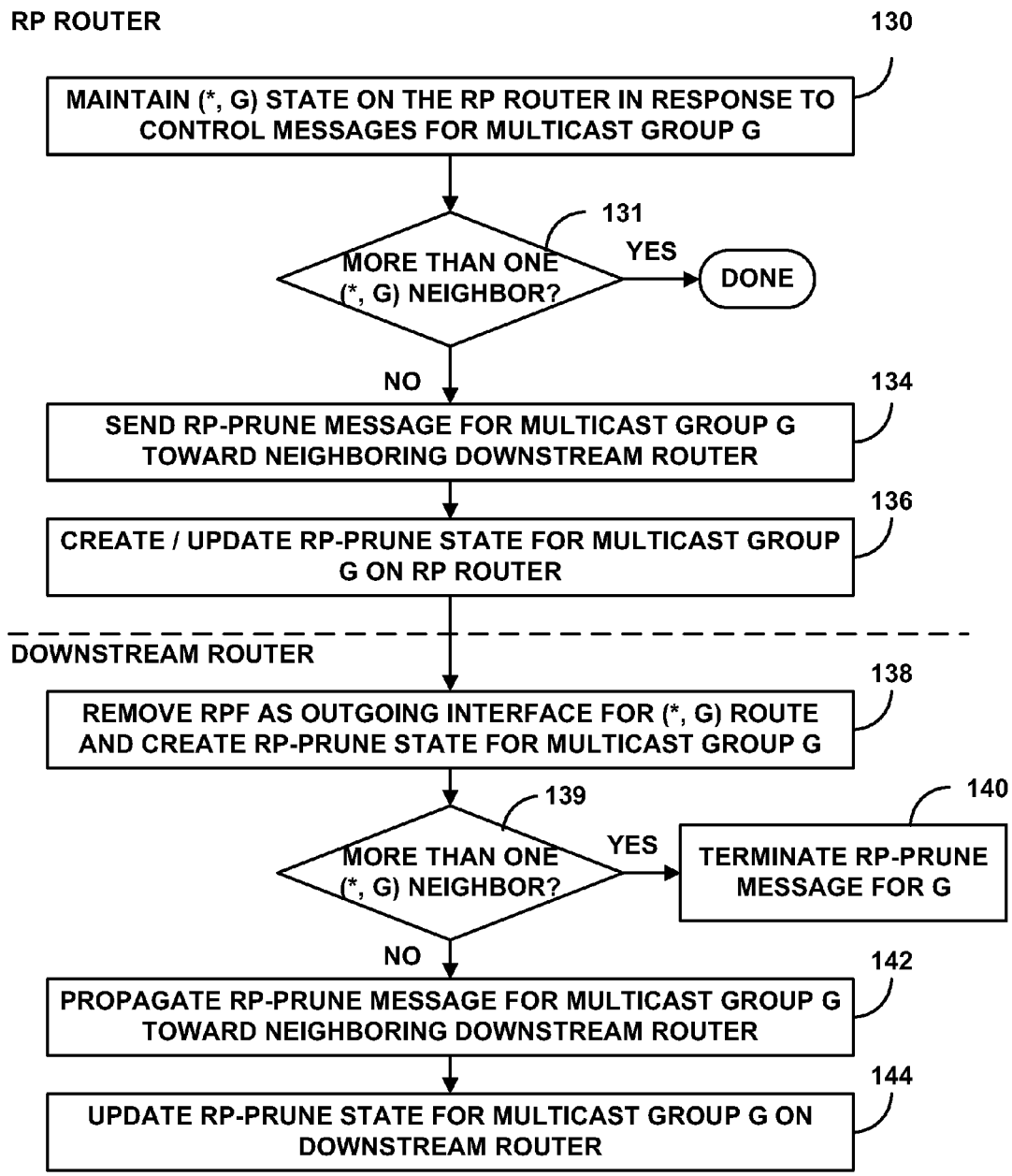
FIG. 4 is a flow chart illustrating an exemplary pruning operation of a RP router and a downstream router in a PIM-BIDIR network in which the RP router has only one neighboring downstream router that belongs to a multicast group G.

FIG. 4 is a flow chart illustrating a pruning operation of a RP router and a downstream router in a PIM-BIDIR network in which the RP router has only one neighboring downstream router that belongs to a multicast group G. The operation illustrated in FIG. 4 will be described in reference to RP router 242 and downstream router R1 244 of PIM-BIDIR network 240 from FIG. 8. The operation illustrated in FIG. 4 may also be described in reference to RP router 258 and downstream router R1 260 of PIM-BIDIR network 256 from FIG. 9.

In the illustrated example of FIG. 8, receiver 254 subscribes to the multicast group G, and RP router 242, downstream router R1 244, and downstream router R4 247 maintain (*, G) group states. Downstream router R4 247 has a (*, G) forwarding route with an outgoing interface list that includes its reverse path forwarding (RPF) interface toward R1 244 and a downstream interface toward receiver 254. In addition, downstream router R1 244 has a (*, G) forwarding route with an outgoing interface list that includes a downstream interface toward R4 247 and its RPF interface toward RP router 242. Moreover, RP router 242 has a (*, G) forwarding route with an outgoing interface list that includes a downstream interface toward R1 244.

RP router 242 maintains the (*, G) group state in its control plane in response to control messages, such as join control messages and/or prune control messages, for the multicast group G received from neighboring downstream routers R1 244 and/or R2 245 (130). When the (*, G) group state is updated, RP router 242 determines whether it has more than one neighboring downstream router in the (*, G) group state (131). The (*, G) group state may be updated, for example when RP router 242 receives a first join control message for the multicast group from R1 244 or when RP router 242 receives a prune control message for the multicast group from R2 245.

In the illustrated example of FIG. 8, R1 244 is the only neighboring downstream router of RP router 242 that belongs to the multicast group G. If RP router 242 does not have more than one neighboring downstream router that belongs to the multicast group G, as in the illustrated example of FIG. 8, (NO or 131), RP router 242 sends a RP-prune control message for the multicast group G to downstream router R1 244 on the downstream interface toward R1 244 (134). In addition, RP router 242 creates and/or updates a RP-prune state for multicast group G to include the downstream interface for downstream router R1 244 on which the RP-prune control message was sent (136).

When downstream router R1 244 receives the RP-prune control message for the multicast group G, R1 244 removes the RPF interface from the outgoing interface list for the multicast group G on R1 244 and creates an RP-prune state for the multicast group G (138). By removing the RPF interface, the only outgoing interface remaining on R1 244 for the multicast group is the downstream interface toward R4 247. As a result, R1 244 will no longer forward any (*, G) multicast traffic upstream toward RP router 242, and will only forward (*, G) multicast traffic that may be received from RP 242 or R3 246 downstream toward R4 247.

Similar to RP router 242, R1 244 also determines whether it has more than one neighboring downstream router that belongs to multicast group state (*, G) (139). If R1 244 has more than one neighboring downstream router that belongs to the multicast group (*, G) (YES of 139), then R1 244 terminates the RP-prune control message for the multicast group (*, G) (140). This operation is substantially similar to the example illustrated in FIG. 9 with respect to R1 260 of PIM-BIDIR network 256.

In the illustrated example of FIG. 8, R4 247 is the only neighboring downstream router of R1 244 that belongs to the multicast group (*, G). If R1 244 does not have more than one neighboring downstream router that belongs to the multicast group G, as in the illustrated example of FIG. 8, (NO of 139), R1 244 propagates the RP-prune control message for the multicast group G to downstream router R4 247 on the downstream interface toward R4 247 (142). In addition, R1 244 updates the RP-prune state for multicast group G to include the downstream interface for downstream router R4 247 on which the RP-prune control message was sent (144).

The further downstream router R4 247 may then perform at least some of the same operations to prune its RPF interface for the multicast group G and terminate or propagate the RP-prune control message for the multicast group G. In this case, because R4 247 has no neighboring downstream routers that belong to the multicast group G, the RP-prune control message will be terminated on R4 247.

By removing the RPF interfaces toward RP router 242 from the outgoing interface lists for the multicast group G, R4 247 and R1 244 will no longer forward any (*, G) multicast traffic upstream toward RP router 242. Instead, when R1 244 receives (*, G) multicast traffic from source 252 via R3 246, the multicast traffic will only be forwarded on the downstream interface toward R4 247 and will not be forwarded upstream toward RP router 242. In this way, traffic will not be unnecessarily carried upstream toward RP router 242 only to be dropped. This reduction in unnecessary upstream traffic may improve bandwidth in the network.

Figure 5:
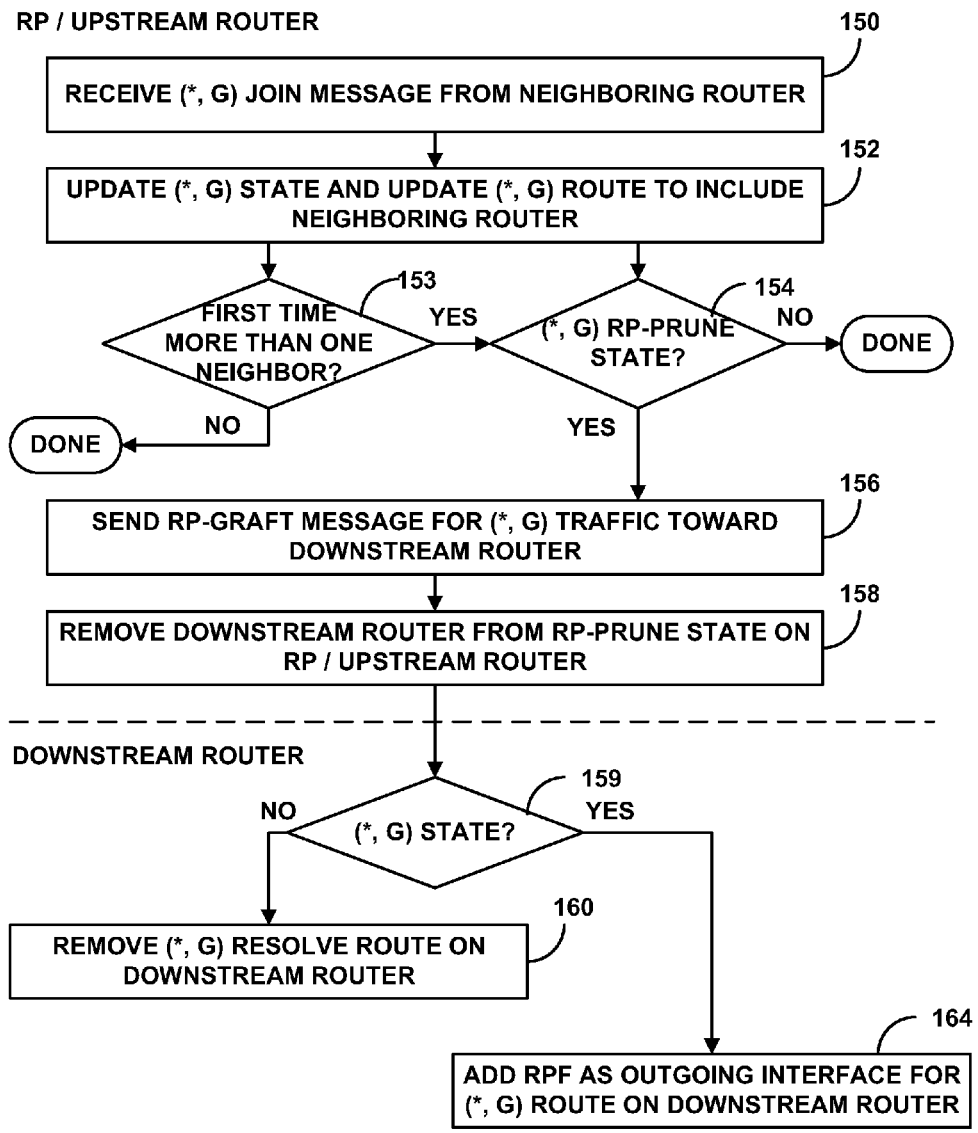
FIG. 5 is a flow chart illustrating an exemplary grafting operation of a RP router or another upstream router and a downstream router in a PIM-BIDIR network in which the RP router or upstream router receives a join control message of a multicast group G.

FIG. 5 is a flow chart illustrating an exemplary grafting operation of a RP router or another upstream router and a downstream router in a PIM-BIDIR network. The operation illustrated in FIG. 5 will first be described in reference to RP router 242 and downstream router R1 244 of PIM-BIDIR network 240 from FIG. 8. The operation illustrated in FIG. 5 will second be described in reference to RP router 226 and downstream router R1 228 of PIM-BIDIR network 224 from FIG. 7. The operation illustrated in FIG. 5 may also be described in reference to or RP router 258 and downstream router R1 260 of PIM-BIDIR network 256 from FIG. 9.

In the example illustrated in FIG. 8, after the techniques described above are used to prune an interface between RP router 242 and downstream router R1 244, RP router 242 may receive a (*, G) join control message from neighboring downstream router R2 245 (150). RP router 242 updates the (*, G) group state maintained in the control plane of RP router 242, and updates its (*, G) forwarding route by adding the downstream interface toward R2 245 to the outgoing interface list (152).

If this is the first time the number of neighboring downstream routers for multicast group G is more than one (YES of 153), then RP router 242 determines whether it has an RP-prune state for the multicast group G (154). If RP router 242 does not have an RP-prune state, it has never sent a RP-prune control message to a neighboring downstream router for the multicast group G (NO of 154), and nothing additional needs to be done. In the illustrated example of FIG. 8, RP router 242 previously sent a RP-prune control message for the multicast group G to downstream router R1 244. If RP router 242 does have a RP-prune state for the multicast group G, as in the illustrated example of FIG. 8 (YES of 154), RP router 242 then sends a RP-graft control message to R1 244 on the downstream interface specified in the RP-prune state (156). RP router 242 also removes the downstream interface to R1 244 from the (*, G) RP-prune state (158).

When downstream router R1 244 receives the RP-graft control message from RP router 242, R1 244 determines whether it has (*, G) group state (159). In the illustrated example of FIG. 8, R1 244 has (*, G) group state (YES of 159), so R1 244 adds its RPF interface toward RP router 242 back to the outgoing interface list for the multicast group G (164). As a result, R1 244 resumes forwarding the (*, G) multicast traffic on its RPF interface upstream toward RP router 242 according to the updated (*, G) forwarding route. When the (*, G) multicast traffic reaches RP router 242, the multicast traffic will be distributed to R2 245 on the downstream interface according to the updated (*, G) forwarding route.

In the example illustrated in FIG. 7, after the techniques described above are used to prune interfaces between RP router 226 and R1 228, and R1 228 and R3 230, RP router 226 may receive a join control message for the multicast group G from downstream router R2 229 (150). RP router 226 creates a multicast group state for the multicast group G in the control plane of RP router 226, and updates a forwarding route for the multicast group G with an outgoing interface list that includes the downstream interface toward R2 229 (152).

If this is the first time the number of neighboring downstream routers for multicast group G is more than one (YES of 153), then RP router 226 determines whether it has an RP-prune state for the multicast group G (154). If RP router 226 does not have an RP-prune state because it has never sent a RP-prune control message to a neighboring downstream router for the multicast group G (NO of 154), then nothing additional needs to be done in response to receiving the (*, G) join control message. In the illustrated example of FIG. 7, RP router 226 previously sent a RP-prune control message for the multicast group G to downstream router R1 228 so it does have a RP-prune state for the multicast group G, as in the illustrated example of FIG. 7 (YES of 154), RP router 226 then sends a RP-graft control message for the (*, G) multicast group to R1 228 on the downstream interface specified in the RP-prune state (156). RP router 226 also removes the downstream interface to R1 228 from the RP-prune state for the multicast group G on RP router 226 (158).

When downstream router R1 228 receives the RP-graft control message for the multicast group G from RP router 226, R1 228 determines whether it has (*, G) group state (159). In the illustrated example of FIG. 7, R1 228 does not have (*, G) group state (NO of 159), so R1 228 removes the (*, G) resolve route. Similar to RP router 226, R1 228 sends a RP-graft control message to downstream router R3 230. Downstream router R3 230 processes the RP-graft control message similar to R1 228.

After the (*, G) resolve routes are deleted, R3 230 and R1 228 may forward multicast traffic G on their RPF interfaces upstream towards RP 226 by following the (*, G_prefix) forwarding route. When RP router 226 receives (*, G) multicast traffic, RP router 226 forwards the traffic on its downstream interface to R2 229 according to its (*, G) forwarding route.

Figure 6A:
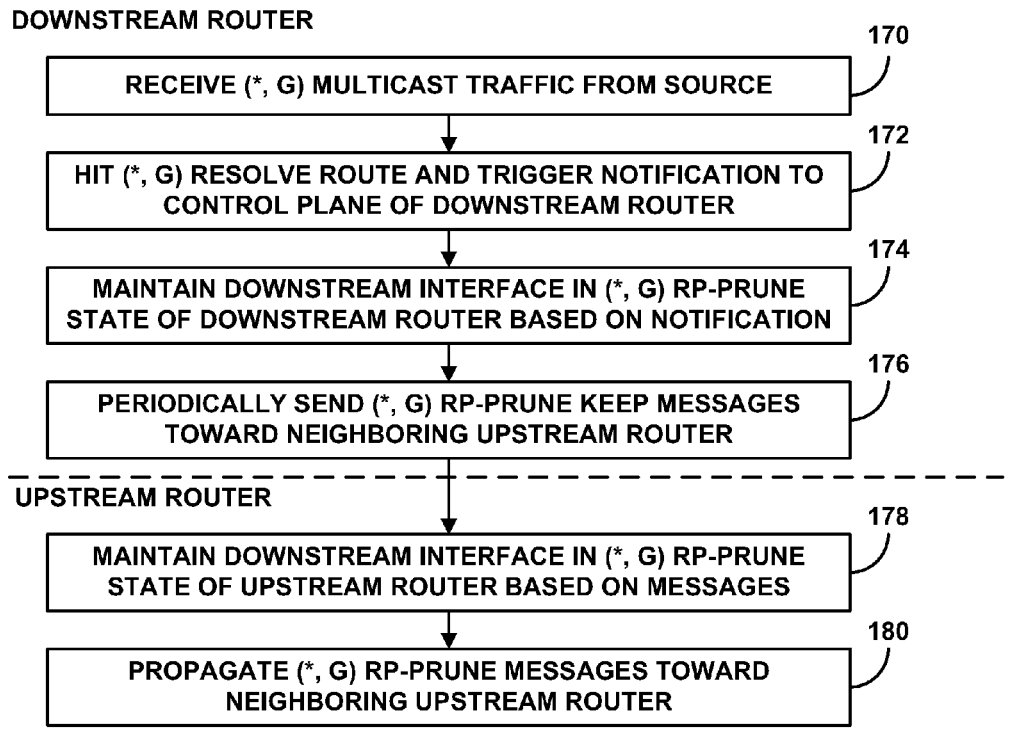
FIGS. 6A and 6B are flow charts illustrating exemplary maintenance operations of RP-prune states in a control plane of a RP router or another upstream router and a downstream router.
Figure 6B:
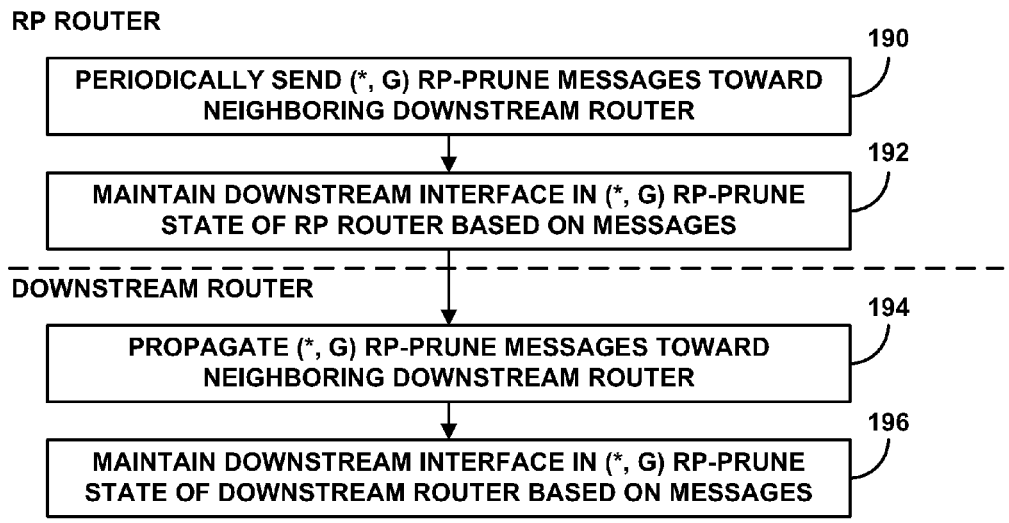

FIGS. 6A & 6B are flow charts illustrating exemplary maintenance operations of RP-prune states in a control plane of an RP router or another upstream router and a downstream router. FIG. 6A illustrates a maintenance operation of RP-prune states in a downstream router and an upstream router in a PIM-BIDIR network in which no receivers subscribe to a multicast group G. The operation illustrated in FIG. 6A will be described in reference to downstream router R3 230 and upstream router R1 228 and RP router 226 of PIM-BIDIR network 224 from FIG. 7. In this case, where R3 230, R1, 228 and RP 226 have (*, G) RP-prune states but no (*, G) join states, the RP-prune states are maintained in a reverse direction.

In the example illustrated in FIG. 7, after the techniques described above are used to prune interfaces between RP router 226 and R1 228 and between R1 228 and R3 230, R3 230 may continue to receive (*, G) multicast traffic from source 238 (170). The (*, G) multicast traffic will hit the (*, G) resolve route and trigger a notification to the control plane of downstream router R3 230 (172). R3 230 maintains or refreshes the downstream interface toward source 238 in its (*, G) RP-prune state based on the notification from the (*, G) resolve route (174). As long as R3 230 continues to receive (*, G) multicast traffic from source 238, its (*, G) RP-prune state is maintained and R3 230 periodically sends (*, G) RP-prune keep control messages toward neighboring upstream router R1 228 (176).

Upstream router R1 228 receives the RP-prune keep control messages, and maintains or refreshes the downstream interface toward R3 230 in the (*, G) RP-prune state of R1 228 based on the messages (178). R1 228, in turn, propagates the (*, G) RP-prune keep control messages toward RP router 226 (180). Upon receiving the RP-prune keep control messages, RP router 226 maintains or refreshes the downstream interface toward R1 228 in the RP-prune state of RP router 226. In this way, if receivers interested in the (*, G) multicast traffic appear in network 224, the previously pruned RPF interfaces can be added back as outgoing interfaces for the multicast group G by the graft procedure that follows the prune states.

After source 238 stops transmitting (*, G) multicast traffic, the (*, G) RP-prune states on each of R3 230, R1 228 and RP 226 will time out and be removed because there will be no more resolve requests. As a result, upstream routers will no longer receive (*, G) RP-prune keep control messages and will also time out their prune states. R3 230 may optionally send an RP-prune cancel control message upstream toward R1 228, which may be propagated further upstream toward RP router 226, to immediately remove the (*, G) RP-prune states instead of timing out.

FIG. 6B illustrates an example maintenance operation of RP-prune states in a RP router and a downstream router in a PIM-BIDIR network in which the RP router has only one neighboring downstream router that belongs to a multicast group G. The operation illustrated in FIG. 6B will be described in reference to RP router 242 and downstream routers R1 244 and R4 247 of PIM-BIDIR network 240 from FIG. 8. The operation illustrated in FIG. 6B may also be described in reference to RP router 258 and downstream router R1 260 of PIM-BIDIR network 256 from FIG. 9.

In this case, where RP 242, R1 244, and R4 247 have both (*, G) RP-prune states and (*, G) join states, RP router 242 periodically sends a refresh RP-prune message for the multicast group G to the pruned downstream routers. RP 244 also maintains or refreshes the downstream interface toward R1 244 in its (*, G) RP-prune state based on the messages (192). Downstream router R1 244 receives the RP-prune control messages, and propagates the (*, G) RP-prune control messages toward further downstream router R4 247 (194). R1 244 also maintains or refreshes the downstream interface toward R4 247 in the (*, G) RP-prune state of R1 244 based on the messages (196). Upon receiving the RP-prune keep control messages, R4 247 may similarly maintain any downstream interfaces in its (*, G) RP-prune state. In this way, if receivers interested in the (*, G) multicast traffic appear in network 240, the previously pruned RPF interfaces can be added back as outgoing interfaces for the multicast group G by the graft procedures following the prune states.

FIG. 7 is a block diagram illustrating an exemplary PIM-BIDIR computer network 224 in which no receivers subscribe to a multicast group G. Network 224 includes a RP router 226 and downstream routers R1 228, R2 229, R3 230, R4 234, R5 231, R6 232, R7 235, and R8 236 configured to perform techniques for reducing unnecessary upstream multicast traffic for the multicast group G from a source 238 toward RP router 226.

As described above, RP router 226 may be associated with a certain range of multicast groups (*, G_prefix). According to PIM-BIDIR, the downstream routers in network 224 send all multicast traffic for the multicast groups within the given range to RP router 226 for distribution to routers that maintain state for the multicast groups. By default, PIM-BIDIR installs (*, G_prefix) forwarding routes in the downstream routers included in network 24 to enable forwarding of multicast traffic for a multicast group toward RP router 226 even if the downstream routers do not maintain multicast group states for that specific multicast group. Each of the downstream routers has an outgoing interface for the (*, G_prefix) forwarding route set to its RPF interface toward RP router 226. A RPF interface is an interface of a downstream router that is closest to RP router 226 based on routing information stored on the downstream router.

Conventionally, multicast traffic for a multicast group within the range is forwarded toward the RP regardless of whether any receivers subscribe to the specific multicast group. Upon receiving the multicast traffic, the RP would determine that it does not maintain a multicast group state for the multicast group and, therefore, no neighboring downstream routers belong to the multicast group. The RP would then look to its (*, G_prefix) forwarding route with no outgoing interfaces and drop the multicast traffic. This may result in the RP having to discard large amounts of unnecessary multicast traffic.

According to the techniques described herein, RP router 226 and the downstream routers in network 224 may be configured to reduce the unnecessary upstream multicast traffic for the multicast group G toward RP router 226. The techniques include an extension to PIM-BIDIR in which a (*, G_prefix) resolve route is installed in RP router 226 which will cause a notification to be sent to the control plane of RP router 226, instead of a conventional (*, G_prefix) forwarding route that causes traffic that matches the route to be dropped. A "resolve" route does not define a route for the router to forward data, but instead defines a way for the data plane of the router to send a notification to the control plane of the router. For example, the (*, G_prefix) resolve route notifies the control plane of RP router 226 that RP router 226 does not need to receive the multicast traffic for a given multicast group because no receivers are subscribers to the multicast group.

The techniques also include an extension to PIM-BIDIR in which, as a result of the notification, RP router 226 sends an RP-prune control message to downstream router R1 228 from which the multicast traffic was received. Since R1 228 does not have (*, G) group state, R1 228 installs a (*, G) resolve route in response to the RP-prune control message to effectively prune the RPF interface of R1 228 toward RP router 226 as an outgoing interface for (*, G) multicast traffic. Downstream router R1 228 may also propagate the RP-prune control message further downstream if triggered by additional multicast traffic for the multicast group from R3 230. The additional multicast traffic will match the (*, G) resolve route and trigger a notification that causes R1 228 to send a RP-prune control message further downstream to R3 230. The extensions to PIM-BIDIR also include maintenance of a RP-prune state for the multicast group by each router that sends or receives an RP-prune control message. Similar extensions are included to later add the RPF interfaces back as outgoing interfaces for the multicast group.

In the illustrated example of FIG. 7, no receivers subscribe to the multicast group G such that no routers are maintaining (*, G) group states. When R3 230 receives (*, G) multicast traffic from source 238, R3 230 determines that it does not maintain (*, G) group state and instead forwards the multicast traffic on its RPF interface toward R1 228 according to the (*, G_prefix) forwarding route. Upon receiving the (*, G) multicast traffic from R3 230, R1 228 also determines that it does not maintain (*, G) group state and instead forwards the multicast traffic on its RPF interface toward RP router 226 according to the (*, G_prefix) forwarding route. When the (*, G) multicast traffic reaches RP router 226, which also does not maintain (*, G) group state, the multicast traffic hits the (*, G_prefix) resolve route and triggers a notification to the control plane of RP router 226 that RP router 226 does not need to receive the (*, G) multicast traffic.

In response to the control plane notification, RP router 226 sends a RP-prune control message for the multicast group G to downstream router R1 228 on the downstream interface on which it received the (*, G) multicast traffic. In addition, RP router 226 creates and/or updates a RP-prune state for the specific multicast group G to include the downstream interface to R1 228 on which the RP-prune control message was sent.

When downstream router R1 228 receives the RP-prune control message for the multicast group G, R1 228 effectively prunes its RPF interface as an outgoing interface to prevent itself from forwarding multicast traffic for the multicast group G to RP router 226. More specifically, R1 228 installs a resolve route for the multicast group G and creates an RP-prune state for the multicast group G that does not include any downstream interfaces. By installing the (*, G) resolve route, R1 228 will no longer forward any (*, G) multicast traffic toward RP router 226.

If R1 228 later receives (*, G) multicast traffic from R3 230, the multicast traffic will hit the (*, G) resolve route installed in R1 228 and trigger a notification to the control plane of R1 228 that R1 228 does not need to forward the multicast traffic to RP router 226. In this way, instead of forwarding the unnecessary (*, G) multicast traffic toward RP router 226, R1 228 drops the multicast traffic and propagates the RP-prune control message for the multicast group G to R3 230 according to the resolve route. R1 228 sends the RP-prune control message for the multicast group G to downstream router R3 230 on the downstream interface on which it received the (*, G) multicast traffic. In addition, R1 228 updates its RP-prune state for the specific multicast group G to include the downstream interface toward downstream router R3 230 on which the RP-prune control message was sent.

Similar procedures may be performed by downstream router R3 230 to prune its RPF interface as an outgoing interface, install a resolve route for the multicast group G, and create an RP-prune state for the multicast group G. By installing the (*, G) resolve route, when R3 230 receives (*, G) multicast traffic from source 238, the multicast traffic will hit the (*, G) resolve route and be dropped by R3 230. In this way, unnecessary upstream traffic will not be carried toward RP router 226 only to be dropped. This reduction in unnecessary upstream traffic may improve bandwidth for computer network 224.

After the interfaces are pruned, R3 230 may need to send control messages to maintain the (*, G) RP-prune states until source 238 stops transmitting (*, G) multicast traffic. In this way, if receivers interested in the (*, G) multicast traffic appear, the previously pruned RPF interfaces can be added back as outgoing interfaces for the multicast group G. Once source 238 stops transmitting (*, G) multicast traffic, the (*, G) RP-prune states on each of R3 230, R1 228 and RP 226 will time out and be removed. In some cases, R3 230 may send an RP-prune cancel control message upstream toward R1 228, which may be propagated further upstream toward RP router 226, to immediately remove the (*, G) RP-prune states instead of timing out.

In this case, where R3 230, R1, 228 and RP 226 have (*, G) RP-prune states but no (*, G) join states, the RP-prune states are maintained in a reverse direction. If R3 230 continues to receive (*, G) multicast traffic from source 238, the notifications from the resolve route maintain the downstream interface toward source 238 in the (*, G) RP-prune state of R3 230. As long as the (*, G) RP-prune state is maintained, R3 230 periodically sends RP-prune keep control message upstream toward R1 228. The RP-prune keep control messages maintain the downstream interface toward R3 230 in the (*, G) RP-prune state of R1 228. R1 228, in turn, periodically sends RP-prune keep control messages to RP router 226 to maintain the downstream interface toward R1 228 in the RP-prune state of RP router 226.

In the future a receiver may subscribe to the multicast group G such that R3 230 and R1 228 will need to forward (*, G) multicast traffic from source 238 to RP router 226 for distribution to the receiver. As one example, downstream router R2 229 may send a join control message for the multicast group G to RP router 226. RP router 226 creates a multicast group state for the multicast group G in the control plane of RP router 226, and installs a forwarding route for the multicast group G with an outgoing interface list that includes the downstream interface toward R2 229. RP router 226 also determines that a RP-prune control message for the multicast group G was previously sent to R1 228 based on the RP-prune state for the multicast group in the control plane of RP router 226. RP router 226 then sends a RP-graft control message for the (*, G) multicast group to R1 228 on the downstream interface specified in the RP-prune state, and removes the downstream interface from the RP-prune state for the multicast group.

When R1 228 receives the RP-graft control message for the multicast group G from RP router 226, R1 228 removes the (*, G) resolve route for the multicast group G. Similar to RP router 226, R1 228 determines that a RP-prune control message for the multicast group G was previously sent to R3 230 based on the RP-prune state for the multicast group in the control plane of R1 228. R1 228 then sends a RP-graft control message for the (*, G) multicast group to R3 230 on the downstream interface specified in the RP-prune state, and removes the downstream interface from the RP-prune state for the multicast group. When R3 230 receives the RP-graft control message for the multicast group G from R1 228, R3 230 removes the (*, G) resolve route for the multicast group G.

After the RPF interfaces are added back as outgoing interfaces for the multicast group G, R3 230 forwards (*, G) multicast traffic from source 238 on its RPF interface to R1 228 according to the default (*, G_prefix) forwarding route. When R1 228 receives (*, G) multicast traffic, R1 228 also forwards the traffic on its RPF interface toward RP router 226 according to the default (*, G_prefix) forwarding route. Finally, when RP router 226 receives (*, G) multicast traffic, RP router 226 forwards the traffic on the downstream interface to R2 229 according to the (*, G) forwarding route.

As another example, downstream router R4 234 may send a join control message for the multicast group G to R1 228. In response, R1 228 creates a multicast group state for the multicast group in the control plane of R1 228, and installs a forwarding route for the multicast group G with an outgoing interface list that includes the RPF interface of R1 228 toward RP router 226 and a downstream interface toward R4 234. R1 228 also determines that a RP-prune control message for the multicast group G was previously sent to R3 230 based on the RP-prune state for the multicast group maintained in the control plane of R1 228. R1 228 then sends a RP-graft control message for the (*, G) multicast group to R3 230 on the downstream interface specified in the RP-prune state, and removes the downstream interface from the RP-prune state for the multicast group. When R3 230 receives the RP-graft control message for the multicast group G from R1 228, R3 230 removes the (*, G) resolve route for the multicast group G.

In this example, because all PIM-BIDIR join control messages are processed by RP router 226, R1 228 forwards the (*, G) join control message from R4 234 toward RP router 226. As described above, RP router 226 creates a multicast group state for the multicast group G in the control plane of RP router 226, and installs a forwarding route for the multicast group G with an outgoing interface list that includes the downstream interface toward R1 228. RP router 226 determines that a RP-prune control message for the multicast group G was previously sent to R1 228 based on the RP-prune state for the multicast group maintained in the control plane of RP router 226. RP router 226 then sends a RP-graft control message for the (*, G) multicast group to R1 228 on the downstream interface specified in the RP-prune state, and removes the downstream interface from the RP-prune state for the multicast group. When R1 228 receives the RP-graft control message for the multicast group G from RP router 226, R1 228 removes the (*, G) resolve route for the multicast group G.

In some cases, after the (*, G) state is created in one or more routers of network 24, RP router 226 may again determine whether it needs to receive the multicast traffic for the multicast group G. For example, as described in more detail below with respect to FIGS. 8 and 9, RP router 226 may determine that R1 228 is the only neighboring downstream router that belongs to the multicast group G such that RP router 226 does not need to receive the (*, G) multicast traffic and the interface between R1 228 and RP router 226 may be pruned.

FIG. 8 is a block diagram illustrating an exemplary PIM-BIDIR network 240 in which a RP router 242 has only one neighboring downstream router, R1 244, that belongs to a multicast group G. Network 240 includes RP router 242 and routers R1 244, R2 245, R3 246, R4 247, R5 248, R6 249, R7 250, and R8 251 configured to perform techniques for reducing unnecessary upstream multicast traffic for the multicast group G toward RP router 242. RP router 242 and the downstream routers may comprise edge routers and/or core routers.

As described above, RP router 242 may be associated with a certain range of multicast groups (*, G_prefix), and all the downstream routers in network 240 include (*, G_prefix) forwarding routes to enable forwarding of all multicast traffic for the multicast groups within the range to RP router 242. In the illustrated example of FIG. 8, RP router 242, downstream router R1 244, and downstream router R4 247 also maintain multicast group states for multicast group G. For example, downstream router R4 247 has a (*, G) forwarding route with an outgoing interface list that includes its reverse path forwarding (RPF) interface toward R1 244. In addition, downstream router R1 244 has a (*, G) forwarding route with an outgoing interface list that includes a downstream interface toward R4 247 and its RPF interface toward RP router 242.

Moreover, RP router 242 has a (*, G) forwarding route with an outgoing interface list that includes a downstream interface toward R1 244. As described above, a RPF interface is an interface of a downstream router that is closest to RP router 242 based on routing information stored on the downstream router.

Conventionally, multicast traffic for multicast group G is forwarded toward the RP regardless of whether the RP has more than one neighboring downstream router that belongs to the multicast group G to which the RP needs to distribute the multicast traffic. Upon receiving upstream multicast traffic from the only neighboring downstream router that belongs to the multicast group, the RP would determine that it does not have any other neighboring downstream routers that belong to the multicast group based on the (*, G) group state. The RP would then drop the multicast traffic for the multicast group G. This may result in the RP having to discard large amounts of unnecessary multicast traffic.

According to the techniques described herein, RP router 242 and the downstream routers in network 240 may be configured to reduce the unnecessary upstream multicast traffic for the multicast group G toward RP router 242 from R1 244 as the only neighboring downstream router that belongs to the multicast group G. The techniques include an extension to PIM-BIDIR in which RP router 242 sends an RP-prune control message to R1 244 to prune the RPF interface toward RP router 242 as an outgoing interface for the multicast group G. Downstream router R1 244 may then propagate the RP-prune control message further downstream toward R4 247 as the only one neighboring downstream router of R1 244 that belongs to the multicast group G. The extensions to PIM-BIDIR also include maintenance of a RP-prune state for the multicast group by each router that sends or receives an RP-prune control message. Similar extensions are included to later add the interfaces back as outgoing interfaces for the multicast group G.

In the illustrated example of FIG. 8, receiver 254 subscribes to the multicast group G and RP router 242, R1 244, and R4 247 maintain (*, G) group states. The routers conceptually form a shared tree rooted at RP router 242 in network 240 based on the join control messages for the multicast group propagated upstream from R4 247 and R1 244 after receiver 254 requested (*, G) multicast traffic. The routers in the shared tree also create group state for the multicast group G. RP router 242 determines whether it has more than one neighboring downstream router that has the (*, G) group state. As illustrated in FIG. 8, R1 244 is the only neighboring downstream router of RP router 242 that has the (*, G) group state. RP router 242 may makes this determination when the (*, G) group state is updated, for example when RP router 242 receives a first join control message for the multicast group from R1 244 or when RP router 242 receives a prune control message for the multicast group from R2 245.

In response to the determination that R1 244 is its only neighboring downstream router that belongs to multicast group G, RP router 242 sends a RP-prune control message for the multicast group G to downstream router R1 244 on the downstream interface toward R1 244. In addition, RP router 242 creates and/or updates a RP-prune state for multicast group G to include the downstream interface to downstream router R1 244 on which the RP-prune control message was sent. When downstream router R1 244 receives the RP-prune control message for the multicast group G, R1 244 prunes its RPF interface as an outgoing interface to prevent itself from forwarding multicast traffic for multicast group G to RP router 242. More specifically, R1 244 removes the RPF interface from the outgoing interface list for the multicast group G. R1 244 also creates an RP-prune state for multicast group G that does not include any downstream interfaces.

By removing the RPF interface, the only outgoing interface remaining on R1 244 for the multicast group is the downstream interface toward R4 247. In this way, R1 244 will no longer forward any (*, G) multicast traffic upstream toward RP router 242, and will only forward (*, G) multicast traffic downstream toward R4 247. In this way, unnecessary upstream traffic will not be carried toward RP router 242 only to be dropped. This reduction in unnecessary upstream traffic may improve bandwidth for network 240.

As an example, when R3 246 receives (*, G) multicast traffic from source 252, R3 246 determines that it does not have (*, G) group state and instead forwards the multicast traffic on its RPF interface toward R1 244 according to the (*, G_prefix) forwarding route. Upon receiving the (*, G) multicast traffic from R3 230, R1 244 determines that it does have (*, G) group state. R1 244 forwards the (*, G) multicast traffic on the downstream interface toward R4 247 according to the (*, G) forwarding route. R1 244 does not forward the (*, G) multicast traffic toward RP router 242 because the RPF interface toward RP router 242 has been pruned from the outgoing interface list for the multicast group. When the (*, G) multicast traffic reaches R4 247, the multicast traffic may be forwarded to receiver 254.

Similar to RP router 242, R1 244 may also determine whether it has more than one neighboring downstream router that has the (*, G) group state. As illustrated in FIG. 8, R4 247 is the only neighboring downstream router of R1 244 that belongs to the multicast group G. In response to the determination that R4 247 is its only neighboring downstream router that belongs to multicast group G, R1 244 propagates the RP-prune control message for the multicast group G to downstream router R4 247 on the downstream interface toward R4 247. In addition, R1 244 updates its RP-prune state for multicast group G to include the downstream interface to downstream router R4 247 on which the RP-prune control message was sent.

When downstream router R4 247 receives the RP-prune control message for the multicast group G, R4 247 prunes its RPF interface as an outgoing interface to prevent itself from forwarding multicast traffic for multicast group G to R1 244. More specifically, R4 247 removes the RPF interface from the outgoing interface list for the multicast group. R4 247 also creates a RP-prune state for the multicast group G. In this way, R4 247 will no longer forward any (*, G) multicast traffic upstream toward R1 244.

After the interfaces are pruned, RP router 242 may need to send additional control messages to maintain the (*, G) RP-prune states on R1 244 and R4 247. In this case, where RP 242, R1 244, and R4 247 have both (*, G) RP-prune states and (*, G) join states, RP router 242 may periodically send a refresh RP-prune message for the multicast group G to the pruned downstream routers. In this way, RP router 242 may maintain the downstream interface toward R1 244 in its (*, G) prune state based on the message. Upon receiving the refresh RP-prune message, R1 244 may propagate the RP-prune message toward R4 247, and may maintain the downstream interface toward R4 247 in the (*, G) prune state of R1 244. R4 247 may similarly maintain any downstream interfaces in its (*, G) RP-prune state.

In the future, additional receivers may subscribe to the multicast group G such that RP router 242 may need to receive (*, G) multicast traffic for further distribution to more than one neighboring downstream router. For example, downstream router R2 245 may send a join control message for the multicast group G to RP router 242. RP router 242 updates the (*, G) group state maintained in the control plane of RP router 242, and adds the downstream interface toward R2 245 to the outgoing interface list for the multicast group G. RP router 242 also determines that a RP-prune control message for the multicast group G was previously sent to R1 244 based on the RP-prune state for the multicast group in the control plane of RP router 242. RP router 242 then sends a RP-graft control message for the (*, G) multicast group to R1 244 on the downstream interface specified in the RP-prune state, and removes the downstream interface from the RP-prune state for the multicast group. When R1 244 receives the RP-graft control message for the multicast group G from RP router 242, R1 244 adds its RPF interface toward RP router 242 back to the outgoing interface list for the multicast group G.

After the interface is added back as an outgoing interface for the multicast group G, R3 246 forwards (*, G) multicast traffic from source 252 on its RPF interface to R1 244 according to the default (*, G_prefix) forwarding route. Upon receiving the (*, G) multicast traffic from R3 246, R1 244 determines that it does have (*, G) group state. R1 244 forwards the (*, G) multicast traffic on the downstream interface toward R4 247 and on its RPF interface upstream toward RP router 242 according to the updated (*, G) forwarding route. When the (*, G) multicast traffic reaches RP router 242, the multicast traffic is distributed to R2 245 on the downstream interface according to the updated (*, G) forwarding route.

FIG. 9 is a block diagram illustrating another exemplary PIM-BIDIR network 256 in which a RP router 258 has only one neighboring downstream router, R1 260, that belongs to a multicast group G. Network 256 includes RP router 258 and downstream routers R1 260, R2 261, R3 262, R4 264, R5 265, R6 266, R7 268, and R8 269 configured to perform techniques for reducing unnecessary upstream multicast traffic for the multicast group G from a source 272 toward RP router 258. RP router 258 and the downstream routers may comprise edge routers and/or core routers.

The exemplary network 256 of FIG. 9 is substantially similar to the exemplary network 240 of FIG. 8, but includes additional downstream routers that belong to the multicast group G. In the illustrated example of FIG. 9, therefore, the neighboring downstream router R1 260 of RP router 258 does not propagate an RP-prune control message toward any further downstream routers, but instead terminates the RP-prune control message.

As described above, RP router 258 may be associated with a certain range of multicast groups (*, G_prefix), and all the downstream routers in network 256 include (*, G_prefix) forwarding routes to enable forwarding of all multicast traffic for the multicast groups within the range to RP router 258. In the illustrated example of FIG. 9, RP router 258 and downstream routers R1 260, R3 262, R4 264, R6 266, and R8 269 also maintain multicast group states for multicast group G. For example, R8 269 has a (*, G) forwarding route with an outgoing interface list that includes its RPF interface toward R4 264. In addition, R4 264 has a (*, G) forwarding route with an outgoing interface list that includes a downstream interface toward R8 269, and its RPF interface toward R1 260. R6 266 also has a (*, G) forwarding route with an outgoing interface list that includes its RPF interface toward R3 262. R3 262 has a (*, G) forwarding route with an outgoing interface list that includes a downstream interface toward R6 266, and its RPF interface toward R1 260. Moreover, R1 260 has a (*, G) forwarding route with an outgoing interface list that includes downstream interfaces toward R3 262 and R4 264, and its RPF interface toward RP router 258. Finally, RP router 258 has a (*, G) forwarding route with an outgoing interface list that includes a downstream interface toward R1 260. As described above, a RPF interface is an interface of a downstream router that is closest to RP router 258 based on routing information stored on the downstream router.

As described above in reference to FIG. 8, conventionally, multicast traffic for multicast group G is forwarded toward the RP regardless of whether the RP has more than one neighboring downstream router that has (*, G) group state to which the RP needs to distribute the multicast traffic. Upon receiving upstream multicast traffic from the only neighboring downstream router that belongs to the multicast group, the RP would determine that it does not have any other neighboring downstream routers that have the (*, G) group state. The RP would then drop the multicast traffic for the multicast group G. This may result in the RP having to discard large amounts of unnecessary multicast traffic.

According to the techniques described herein, RP router 258 and the downstream routers in network 256 may be configured to reduce the unnecessary upstream multicast traffic for the multicast group G toward RP router 258 from R1 260 as the only neighboring downstream router that has the multicast group G. The techniques include an extension to PIM-BIDIR in which RP router 258 sends an RP-prune control message to R1 260 to prune the RPF interface toward RP router 258 as an outgoing interface for the multicast group G. Downstream router R1 260 may then terminate the RP-prune control message because R1 260 has two neighboring downstream routers R3 262 and R4 264 that have the (*, G) group state. The extensions to PIM-BIDIR also include maintenance of a RP-prune state for the multicast group by each router that sends an RP-prune control message. Similar extensions are included to later add the RPF interfaces back as outgoing interfaces for the multicast group G.

In the illustrated example of FIG. 9, receivers 274 and 275 subscribe to the multicast group G and RP router 258, R1 260, R3 262, R4 264, R6 266, and R8 269 maintain (*, G) group states. The routers conceptually form a shared tree rooted at RP router 258 in network 256 based on the join control messages for the multicast group propagated upstream from R8 269, R4 264 and R1 260 after receiver 275 requested (*, G) multicast traffic, and propagated upstream from R6 266, R3 262 and R1 260 after receiver 274 requested (*, G) multicast traffic. The routers in the shared tree also create group state for the multicast group G. RP router 258 determines whether it has more than one neighboring downstream router that has the (*, G) group state. As illustrated in FIG. 9, R1 260 is the only neighboring downstream router of RP router 258 that has the (*, G) group state. RP router 258 may make this determination when the (*, G) group state is updated, for example when RP router 258 receives a first join control message for the multicast group from R1 260 or when RP router 258 receives a prune control message for the multicast group from R2 261.

In response to the determination that R1 260 is its only neighboring downstream router that has the (*, G) group state, RP router 258 sends a RP-prune control message for the multicast group G to downstream router R1 260 on the downstream interface toward R1 260. In addition, RP router 258 creates and/or updates a RP-prune state for multicast group G to include the downstream interface to downstream router R1 260 on which the RP-prune control message was sent. When downstream router R1 260 receives the RP-prune control message for the multicast group G, R1 260 prunes its RPF interface as an outgoing interface to prevent itself from forwarding multicast traffic for multicast group G to RP router 258. More specifically, R1 260 removes the RPF interface from the outgoing interface list for the multicast group. R1

260 also creates a RP-prune state for multicast group G that does not include any downstream interfaces.

After removing the RPF interface, R1 260 may determine that the outgoing interface list for the multicast group G still includes the downstream interface toward R3 262 and the downstream interface toward R4 264. Based on this determination, R1 260 will terminate the RP-prune message from RP router 258. R1 260 will no longer forward any (*, G) multicast traffic upstream toward RP router 258, but will forward (*, G) multicast traffic downstream toward R3 262 and/or R4 264. In this way, unnecessary upstream traffic will not be carried toward RP router 258 only to be dropped. This reduction in unnecessary upstream traffic may improve bandwidth for network 256.

As an example, when R5 265 receives (*, G) multicast traffic from source 272, R5 265 determines that it does not maintain (*, G) group state and instead forwards the multicast traffic on its RPF interface toward R3 262 according to the (*, G_prefix) forwarding route. Upon receiving the (*, G) multicast traffic from R5 265, R3 262 determines that it has (*, G) group state. R3 262 forwards the (*, G) multicast traffic on the downstream interface toward R6 266 and on its RPF interface toward R1 260 according to the (*, G) forwarding route. When the (*, G) multicast traffic reaches R6 266, the multicast traffic may be forwarded to receiver 274. Upon receiving the (*, G) multicast traffic from R3 262, R1 260 determines that it also maintains (*, G) group state. R1 260 forwards the (*, G) multicast traffic on the downstream interface toward R4 264 according to the (*, G) forwarding route. R1 260 does not forward the (*, G) multicast traffic toward RP 258 because the RPF interface toward RP router 258 has been pruned from the outgoing interface list for the multicast group. R4 264 then determines that it maintains (*, G) group state and forwards the (*, G) multicast traffic on the downstream interface toward R8 269 according to the (*, G) forwarding route. When the (*, G) multicast traffic reaches R8 269, the multicast traffic may be forwarded to receiver 275.

After the interface is pruned, RP router 258 may need to send additional control messages to maintain the (*, G) RP-prune state on R1 260. In this case, where RP 258 and R1 260 have both (*, G) RP-prune states and (*, G) join states, RP router 258 may periodically send a refresh RP-prune message for the multicast group G to the pruned downstream router R1 260. In this way, RP router 258 may maintain the downstream interface toward R1 260 in its (*, G) prune state based on the message. Upon receiving the refresh RP-prune message, R1 260 may terminate the RP-prune message.

In the future, additional receivers may subscribe to the multicast group G such that RP router 258 may need to receive (*, G) multicast traffic for further distribution to more than one neighboring downstream router. For example, downstream router R2 261 may send a join control message for the multicast group G to RP router 258. RP router 258 updates the (*, G) group state maintained in the control plane of RP router 258, and adds the downstream interface toward R2 261 to the outgoing interface list for the multicast group G. RP router 258 also determines that a RP-prune control message for the multicast group G was previously sent to R1 260 based on the RP-prune state for the multicast group in the control plane of RP router 258. RP router 258 then sends a RP-graft control message for the (*, G) multicast group to R1 260 on the downstream interface specified in the RP-prune state, and removes the downstream interface from the RP-prune state for the multicast group. When R1 260 receives the RP-graft control message for the multicast group G from RP router 258, R1 260 adds its RPF interface toward RP router 258 back to the outgoing interface list for the multicast group G.

In this way, when R5 265 receives (*, G) multicast traffic from source 272, R5 265 determines that it does not have (*, G) group state and instead forwards the multicast traffic on its RPF interface toward R3 262 according to the (*, G_prefix) forwarding route. Upon receiving the (*, G) multicast traffic from R5 265, R3 262 determines that it has (*, G) group state. R3 262 forwards the (*, G) multicast traffic on the downstream interface toward R6 266 and on its RPF interface toward R1 260 according to the (*, G) forwarding route. When the (*, G) multicast traffic reaches R6 266, the multicast traffic may be forwarded to receiver 274. Upon receiving the (*, G) multicast traffic from R3 262, R1 260 determines that it has (*, G) group state. R1 260 forwards the (*, G) multicast traffic on the downstream interface toward R4 264 and on its RPF interface toward RP router 258 according to the updated (*, G) forwarding route. Upon receiving the (*, G) multicast traffic, R4 264 determines that it has (*, G) group state and forwards the (*, G) multicast traffic on the downstream interface toward R8 269 according to the (*, G) forwarding route. When the (*, G) multicast traffic reaches R8 269, the multicast traffic may be forwarded to receiver 275. In addition, when the (*, G) multicast traffic reaches RP router 258, the multicast traffic is distributed to R2 261 on the downstream interface according to the updated (*, G) forwarding route.

Various examples of the invention have been described. These and other examples are within the scope of the following claims.

The invention claimed is:
1. A method comprising:
  determining whether a rendezvous point (RP) router in a network needs to receive multicast traffic for a multicast group from a downstream router in the network, wherein the RP router receives control messages for multicast traffic using Protocol Independent Multicast Bidirectional Mode (PIM-BIDIR);
  when the RP router does not need to receive the multicast traffic, sending a RP-prune control message for the multicast group toward the downstream router to prevent the downstream router from forwarding multicast traffic for the multicast group to the RP router; and
  updating a RP-prune state for the multicast group in a control plane of the RP router to include an interface for the downstream router.
2. The method of claim 1, further comprising installing a resolve route in the RP router for a range of multicast groups associated with the RP router, wherein multicast traffic matching the resolve route triggers a notification to the control plane of the RP router indicating that the RP router does not need to receive the multicast traffic.
3. The method of claim 2, further comprising receiving multicast traffic for the multicast group with the RP router from the downstream router, wherein determining whether the RP router needs to receive the multicast traffic comprises:
  determining whether the RP router has a multicast group state for the multicast group;
  when the RP router does not have a multicast group state for the multicast group, hitting the resolve route installed in the RP router with the multicast traffic;
  sending the notification to the control plane of the RP router that the RP router does not need to receive the multicast traffic; and
  dropping the multicast traffic with the RP router.

4. The method of 1, further comprising:
receiving control messages for the multicast group with the RP router from one or more neighboring routers in the network, wherein the control messages comprise one or more of join control messages and prune control messages; and
updating a multicast group state for the multicast group in the control plane of the RP router based on the control messages.

5. The method of claim 4, wherein determining whether the RP router needs to receive the multicast traffic comprises:
determining whether the RP router has more than one neighboring downstream router in the multicast group state for the multicast group; and
when the RP router does not have more than one neighboring downstream router in the multicast group state, determining that the RP router does not need to receive the multicast traffic.

6. The method of claim 1, further comprising:
receiving a join control message for the multicast group with the RP router from another downstream router;
sending a RP-graft control message for the multicast group to the downstream router based on the RP-prune state for the multicast group in the control plane of the RP router; and
removing the interface for the downstream router from the RP-prune state for the multicast group.

7. The method of claim 1, wherein the RP router comprises one of a real RP router configured with a rendezvous point address (RPA), or a general router connected to a RP link of the RPA.

8. A method comprising:
receiving a rendezvous point (RP)-prune control message for a multicast group with a downstream router in a network from a RP router in the network when the RP router does not need to receive multicast traffic for the multicast group from the downstream router, wherein the downstream router receives the RP-prune control message using Protocol Independent Multicast Bidirectional Mode (PIM-BIDIR);
when the downstream router does not have multicast group state for the multicast group, installing a resolve route for the multicast group in the downstream router to prevent the downstream router from forwarding multicast traffic for the multicast group towards the RP router, wherein multicast traffic matching the resolve route triggers a notification to the control plane of the downstream router indicating that the downstream router does not need to forward the multicast traffic to the RP; and
when the downstream router has the multicast group state for the multicast group, removing a reverse path forwarding (RPF) interface as an outgoing interface toward the RP router for the multicast group from a control plane of the downstream router to prevent the downstream router from forwarding multicast traffic for the multicast group towards the RP router.

9. The method of claim 8, further comprising, when the downstream router does not have the multicast group state for the multicast group:
receiving multicast traffic for the multicast group with the downstream router from a neighboring downstream router in the network;
hitting the resolve route installed in the downstream router with the multicast traffic;
sending the notification to the control plane of the downstream router that the downstream router does not need to receive the multicast traffic for forwarding to the RP router;
dropping the multicast traffic with the downstream router;
sending an RP-prune control message for the multicast group toward the neighboring downstream router according to the resolve route; and
updating a RP-prune state for the multicast group in the control plane of the downstream router to include an interface for the neighboring downstream router.

10. The method of claim 8, further comprising:
receiving a RP-graft control message for the multicast group from the RP router; and
when the downstream router does not have the multicast group state for the multicast group, removing the resolve route for the multicast group from the downstream router.

11. The method of claim 8, further comprising, when the downstream router has the multicast group state for the multicast group:
determining whether the downstream router has more than one neighboring downstream router in the multicast group state for the multicast group;
when the downstream router does not have more than one neighboring downstream router in the multicast group state, propagating the RP-prune control message for the multicast group to the one neighboring downstream router in the multicast group state; and
updating a RP-prune state for the multicast group in the control plane of the downstream router to include an interface for the neighboring downstream router.

12. The method of claim 8, further comprising:
receiving a RP-graft control message for the multicast group from the RP router; and
when the downstream router has the multicast group state for the multicast group, adding the RPF interface as the outgoing interface toward the RP router for the multicast group back to the control plane of the downstream router.

13. The method of claim 12, further comprising propagating the RP-graft message for the multicast group to any neighboring downstream routers in a RP-prune state for the multicast group in the control plane of the downstream router.

14. A rendezvous point (RP) router comprising:
a set of interfaces that transfer control messages for multicast traffic with one or more neighboring downstream routers in a network using Protocol Independent Multicast Bidirectional Mode (PIM-BIDIR); and
a control unit that includes a routing engine and a forwarding engine, wherein the control unit determines whether the RP router needs to receive multicast traffic for a multicast group from a downstream router in the network, and
wherein, when the RP router does not need to receive the multicast traffic, the control unit directs one of the set of interfaces to send a RP-prune control message for the multicast group to the downstream router to prevent the downstream router from forwarding multicast traffic for the multicast group to the RP router, and updates a RP-prune state for the multicast group in the routing engine to include an interface for the downstream router.

15. The RP router of claim 14, wherein the control unit installs a resolve route for a range of multicast groups associated with the RP router in the forwarding engine, wherein multicast traffic matching the resolve route triggers a notification to the control plane of the RP router indicating that the RP router does not need to receive the multicast traffic.

16. The RP router of claim 15,
wherein one of the set of interfaces receives multicast traffic for the multicast group from the downstream router, and
wherein the control unit determines whether the routing engine has a multicast group state for the multicast group, and, when the routing engine does not have a multicast group state for the multicast group, the multicast traffic hits the resolve route installed in the forwarding engine, the forwarding engine sends the notification to the routing engine that the RP router does not need to receive the multicast traffic, and the forwarding engine drops the multicast traffic.

17. The RP router of claim 14,
wherein one of the set of interfaces receives control messages for the multicast group from the one or more neighboring routers in the network, wherein the control messages comprise one or more of join control messages and prune control messages, and
wherein the routing engine updates a multicast group state for the multicast group based on the control messages.

18. The RP router of claim 17, wherein the control unit:
determines whether the RP router has more than one neighboring downstream router in the multicast group state for the multicast group in the routing engine; and
when the RP router does not have more than one neighboring downstream router in the multicast group state, determines that the RP router does not need to receive the multicast traffic.

19. The RP router of claim 14,
wherein one of the set of interfaces receives a join control message for the multicast group from another downstream router, and
wherein the control unit directs one of the set of interfaces to send a RP-graft control message for the multicast group to the downstream router based on the RP-prune state for the multicast group in the routing engine, and removes the interface for the downstream router from the RP-prune state for the multicast group.

20. The RP router of claim 14, wherein the RP router comprises one of a real RP router configured with a rendezvous point address (RPA), or a general router connected to a RP link of the RPA.

21. A downstream router comprising:
a set of interfaces that transfer control messages for multicast traffic with a rendezvous point (RP) router and one or more neighboring downstream routers in a network using Protocol Independent Multicast Bidirectional Mode (PIM-BIDIR), and wherein one of the set of interfaces receives a RP-prune control message for a multicast group from the RP router when the RP router does not need to receive multicast traffic for the multicast group from the downstream router; and
a control unit that includes a routing engine and a forwarding engine,
wherein, when the downstream router does not have multicast group state for the multicast group, the control unit installs a resolve route for the multicast group in the forwarding engine to prevent the downstream router from forwarding multicast traffic for the multicast group to the RP router, wherein multicast traffic matching the resolve route triggers a notification to the control plane of the downstream router indicating that the downstream router does not need to forward the multicast traffic to the RP, and wherein, when the downstream router has the multicast group state for the multicast group, the control unit removes a reverse path forwarding (RPF) interface as an outgoing interface toward the RP router for the multicast group from the routing engine to prevent the downstream router from forwarding multicast traffic for the multicast group to the RP router.

22. The downstream router of claim 21,
wherein one of the set of interfaces receives multicast traffic for the multicast group from a neighboring downstream router in the network,
wherein, when the downstream router does not have the multicast group state for the multicast group, the multicast traffic hits the resolve route installed in the forwarding engine, and the forwarding engine sends the notification to the routing engine that the downstream router does not need to receive the multicast traffic for forwarding to the RP router, and the forwarding engine drops the multicast traffic, and
wherein the control unit directs one of the set of interfaces to send the RP-prune control message for the multicast group toward the neighboring downstream router, and updates a RP-prune state for the multicast group in the routing engine to include an interface for the neighboring downstream router.

23. The downstream router of claim 21,
wherein one of the set of interfaces receives a RP-graft control message for the multicast group from the RP router, and
wherein, when the downstream router does not have the multicast group state for the multicast group, the control unit removes the resolve route for the multicast group from the forwarding engine.

24. The downstream router of claim 21, wherein, when the downstream router has the multicast group state for the multicast group, the control unit:
determines whether the downstream router has more than one neighboring downstream router in the multicast group state for the multicast group in the routing engine;
when the downstream router does not have more than one neighboring downstream router in the multicast group state, directs one of the set of interfaces to propagate the RP-prune control message for the multicast group to the one neighboring downstream router in the multicast group state; and
updates a RP-prune state for the multicast group in the routing engine to include an interface for the neighboring downstream router.

25. The downstream router of claim 21,
wherein one of the set of interfaces receives a RP-graft control message for the multicast group from the RP router; and
wherein, when the downstream router has the multicast group state for the multicast group, the control unit adds the RPF interface as the outgoing interface toward the RP router for the multicast group back to the routing engine.

26. The downstream router of claim 25, wherein one of the set of interfaces propagates the RP-graft message for the multicast group to any neighboring downstream routers in a RP-prune state for the multicast group in the routing engine.

27. A non-transitory computer-readable storage medium encoded with instructions for causing one or more programmable processors to:
determine whether a rendezvous point (RP) router in a network needs to receive multicast traffic for a multicast group from a downstream router in the network, wherein the RP receives control messages for multicast traffic using Protocol Independent Multicast Bidirectional Mode (PIM-BIDIR);

when the RP router does not need to receive the multicast traffic, send a RP-prune control message for the multicast group toward the downstream router to prevent the downstream router from forwarding multicast traffic for the multicast group to the RP router; and update a RP-prune state for the multicast group in a control plane of the RP router to include an interface for the downstream router.

28. A non-transitory computer-readable storage medium encoded with instructions for causing one or more programmable processor to:

receive a rendezvous point (RP)-prune control message for a multicast group with a downstream router in a network from a RP router in the network when the RP router does not need to receive multicast traffic for the multicast group from the downstream router, wherein the downstream router receives the RP-prune control message using Protocol Independent Multicast Bidirectional Mode (PIM-BIDIR);

when the downstream router does not have multicast group state for the multicast group, install a resolve route for the multicast group in the downstream router to prevent the downstream router from forwarding multicast traffic for the multicast group towards the RP router, wherein multicast traffic matching the resolve route triggers a notification to the control plane of the downstream router indicating that the downstream router does not need to forward the multicast traffic to the RP; and when the downstream router has the multicast group state for the multicast group, remove a reverse path forwarding (RPF) interface as an outgoing interface toward the RP router for the multicast group from a control plane of the downstream router to prevent the downstream router from forwarding multicast traffic for the multicast group to the RP router.

* * * * *